(12) United States Patent
Srinivasan et al.

(10) Patent No.: US 8,112,549 B2
(45) Date of Patent: Feb. 7, 2012

(54) ALERT MECHANISM FOR NOTIFYING MULTIPLE USER DEVICES SHARING A CONNECTED-DATA-SET

(75) Inventors: Venkatachary Srinivasan, Sunnyvale, CA (US); Marco Boerries, Los Altos Hills, CA (US); Matthias Breuer, Seevetal (DE); Markus Meyer, Winsen Luhe (DE); Torsten Schulz, Pinneberg (DE)

(73) Assignee: Yahoo! Inc., Sunnyvale, CA (US)

( * ) Notice: Subject to any disclaimer, the term of this patent is extended or adjusted under 35 U.S.C. 154(b) by 1633 days.

(21) Appl. No.: 11/183,137

(22) Filed: Jul. 14, 2005

(65) Prior Publication Data

US 2007/0014244 A1    Jan. 18, 2007

(51) Int. Cl.
*G06F 15/16* (2006.01)

(52) U.S. Cl. ........................ 709/248; 709/206; 707/621

(58) Field of Classification Search .................. None
See application file for complete search history.

(56) References Cited

U.S. PATENT DOCUMENTS

| | | |
|---|---|---|
| 4,354,230 A | 10/1982 | Murphy et al. |
| 5,371,743 A | 12/1994 | DeYesso et al. |
| 5,371,882 A | 12/1994 | Ludlam |
| 5,436,960 A | 7/1995 | Campana, Jr. et al. |
| 5,457,478 A | 10/1995 | Frank |
| 5,625,757 A | 4/1997 | Kageyama et al. |
| 5,684,952 A | 11/1997 | Stein |
| 5,727,202 A | 3/1998 | Kucala |
| 5,742,905 A | 4/1998 | Pepe et al. |
| 5,764,908 A | 6/1998 | Shoji et al. |
| 5,814,798 A | 9/1998 | Zancho |
| 5,862,330 A | 1/1999 | Anupam et al. |
| 5,872,926 A | 2/1999 | Levac et al. |
| 5,956,719 A | 9/1999 | Kudo et al. |
| 5,974,238 A * | 10/1999 | Chase, Jr. .................. 709/248 |
| 6,006,274 A * | 12/1999 | Hawkins et al. .......... 709/248 |
| 6,069,896 A | 5/2000 | Borgstahl et al. |
| 6,108,779 A | 8/2000 | Dean et al. |
| 6,141,690 A | 10/2000 | Weiman |
| 6,144,999 A | 11/2000 | Khalidi et al. |
| 6,157,944 A | 12/2000 | Pedersen |
| 6,167,379 A * | 12/2000 | Dean et al. .................. 709/248 |

(Continued)

FOREIGN PATENT DOCUMENTS

EP    1 280 314 A2    1/2003

(Continued)

OTHER PUBLICATIONS

Dawson, F. et al. (Nov. 1998). "Internet Calendaring and Scheduling Core Object Specification (iCalendar)," 139 pages.

(Continued)

*Primary Examiner* — Jeffrey R Swearingen
(74) *Attorney, Agent, or Firm* — Greenberg Traurig, LLP

(57) ABSTRACT

System and method for notifying a user status of communications between a server and the user having one or more user devices in a communication network are disclosed. The system includes a server for communicating with the user, where the server includes a connected-data-set and the one or more user devices share portions of the connected-data-set, logic for monitoring communications between the server and the one or more user devices for a predetermined set of notification conditions, and logic for sending a notification message to the one or more user devices when a notification condition is detected.

42 Claims, 22 Drawing Sheets

U.S. PATENT DOCUMENTS

| | | | |
|---|---|---|---|
| 6,233,577 B1 | 5/2001 | Ramasubramani et al. | |
| 6,243,398 B1 | 6/2001 | Kahane et al. | |
| 6,256,676 B1 | 7/2001 | Taylor et al. | |
| 6,292,833 B1 | 9/2001 | Liao et al. | |
| 6,295,291 B1 | 9/2001 | Larkins | |
| 6,304,981 B1 | 10/2001 | Spears et al. | |
| 6,311,215 B1 | 10/2001 | Bakshi et al. | |
| 6,333,973 B1 | 12/2001 | Smith et al. | |
| 6,457,062 B1 | 9/2002 | Pivowar et al. | |
| 6,463,463 B1 | 10/2002 | Godfrey et al. | |
| 6,489,954 B1 | 12/2002 | Powlette | |
| 6,496,858 B1 | 12/2002 | Frailong et al. | |
| 6,530,083 B1 | 3/2003 | Liebenow | |
| 6,546,425 B1 | 4/2003 | Hanson et al. | |
| 6,587,684 B1 | 7/2003 | Hsu et al. | |
| 6,622,017 B1 | 9/2003 | Hoffman | |
| 6,622,192 B2 | 9/2003 | Chou et al. | |
| 6,633,907 B1 | 10/2003 | Spencer et al. | |
| 6,633,910 B1 | 10/2003 | Rajan et al. | |
| 6,636,897 B1 * | 10/2003 | Sherman et al. | 709/248 |
| 6,647,260 B2 | 11/2003 | Dusse et al. | |
| 6,654,359 B1 | 11/2003 | La Porta et al. | |
| 6,671,824 B1 | 12/2003 | Hyland et al. | |
| 6,691,243 B1 | 2/2004 | Belgardt et al. | |
| 6,697,977 B2 | 2/2004 | Ozaki | |
| 6,728,786 B2 * | 4/2004 | Hawkins et al. | 709/248 |
| 6,742,043 B1 | 5/2004 | Moussa et al. | |
| 6,748,570 B1 | 6/2004 | Bahrs et al. | |
| 6,751,661 B1 | 6/2004 | Geddes | |
| 6,766,469 B2 | 7/2004 | Larson et al. | |
| 6,769,124 B1 | 7/2004 | Schoening et al. | |
| 6,785,868 B1 | 8/2004 | Raff | |
| 6,810,405 B1 * | 10/2004 | LaRue et al. | 709/203 |
| 6,813,770 B1 | 11/2004 | Allavarpu et al. | |
| 6,842,613 B2 | 1/2005 | Mittal | |
| 6,857,123 B1 | 2/2005 | Nuxoll et al. | |
| 6,868,444 B1 | 3/2005 | Kim et al. | |
| 6,892,311 B2 | 5/2005 | Coppock et al. | |
| 6,931,454 B2 | 8/2005 | Deshpande et al. | |
| 6,944,662 B2 | 9/2005 | Devine et al. | |
| 6,965,929 B2 | 11/2005 | Kumar | |
| 7,000,032 B2 | 2/2006 | Kloba et al. | |
| 7,020,662 B2 | 3/2006 | Boreham et al. | |
| 7,051,087 B1 | 5/2006 | Bahl et al. | |
| 7,051,088 B2 | 5/2006 | Sesek | |
| 7,073,050 B2 | 7/2006 | Chen et al. | |
| 7,085,822 B1 | 8/2006 | Donatelli et al. | |
| 7,085,824 B2 | 8/2006 | Forth et al. | |
| 7,089,259 B2 | 8/2006 | Kouznetsov et al. | |
| 7,089,297 B1 | 8/2006 | Salas et al. | |
| 7,093,006 B2 | 8/2006 | Sanjeev et al. | |
| 7,149,810 B1 | 12/2006 | Miller et al. | |
| 7,340,484 B2 | 3/2008 | S et al. | |
| 7,584,114 B2 | 9/2009 | Estrada et al. | |
| 2001/0034791 A1 | 10/2001 | Clubb et al. | |
| 2001/0056444 A1 | 12/2001 | Ide et al. | |
| 2002/0016848 A1 | 2/2002 | Yoshimine et al. | |
| 2002/0091848 A1 | 7/2002 | Agresta et al. | |
| 2002/0107002 A1 | 8/2002 | Duncan et al. | |
| 2002/0108091 A1 * | 8/2002 | Flanagin et al. | 714/798 |
| 2002/0124065 A1 | 9/2002 | Barritt et al. | |
| 2002/0194083 A1 | 12/2002 | Balabhadrapatruni et al. | |
| 2003/0018922 A1 | 1/2003 | Litwin, Jr. et al. | |
| 2003/0084177 A1 | 5/2003 | Mulligan | |
| 2003/0110234 A1 | 6/2003 | Egli et al. | |
| 2003/0130882 A1 | 7/2003 | Shuttleworth et al. | |
| 2003/0131059 A1 | 7/2003 | Brown et al. | |
| 2003/0145074 A1 | 7/2003 | Penick | |
| 2003/0172138 A1 | 9/2003 | McCormack et al. | |
| 2003/0172139 A1 | 9/2003 | Srinivasan et al. | |
| 2003/0172175 A1 | 9/2003 | McCormack et al. | |
| 2003/0212684 A1 | 11/2003 | Meyer et al. | |
| 2004/0003132 A1 | 1/2004 | Stanley et al. | |
| 2004/0010569 A1 | 1/2004 | Thomas et al. | |
| 2004/0044774 A1 | 3/2004 | Mangalik et al. | |
| 2004/0073615 A1 | 4/2004 | Darling | |
| 2004/0083472 A1 | 4/2004 | Rao et al. | |
| 2004/0111478 A1 | 6/2004 | Gross et al. | |
| 2004/0128375 A1 | 7/2004 | Rockwell | |
| 2004/0143836 A1 | 7/2004 | McCormack et al. | |
| 2004/0199614 A1 | 10/2004 | Shenfield et al. | |
| 2004/0210450 A1 | 10/2004 | Atencio et al. | |
| 2004/0247090 A1 | 12/2004 | Nurmela | |
| 2004/0249927 A1 | 12/2004 | Pezutti | |
| 2005/0015599 A1 | 1/2005 | Wang et al. | |
| 2005/0059393 A1 | 3/2005 | Knowles | |
| 2005/0071740 A1 * | 3/2005 | Chee et al. | 715/500 |
| 2005/0164691 A1 | 7/2005 | Payne | |
| 2005/0165947 A1 | 7/2005 | Auriemma et al. | |
| 2005/0216441 A1 | 9/2005 | Thomas et al. | |
| 2006/0047787 A1 | 3/2006 | Agarwal et al. | |
| 2006/0111086 A1 * | 5/2006 | Wilson et al. | 455/413 |
| 2006/0156052 A1 * | 7/2006 | Bodnar et al. | 714/2 |
| 2006/0212330 A1 | 9/2006 | Savilampi | |
| 2006/0259511 A1 | 11/2006 | Boerries et al. | |
| 2007/0014243 A1 | 1/2007 | Meyer et al. | |
| 2007/0014277 A1 | 1/2007 | Ebbesen et al. | |
| 2007/0014278 A1 | 1/2007 | Ebbesen et al. | |
| 2007/0014300 A1 | 1/2007 | Breuer et al. | |
| 2007/0014303 A1 | 1/2007 | Schulz et al. | |
| 2007/0014307 A1 | 1/2007 | Srinivasan et al. | |
| 2007/0016632 A1 | 1/2007 | Schulz et al. | |
| 2007/0016636 A1 | 1/2007 | Boerries et al. | |
| 2007/0016646 A1 | 1/2007 | Tendjoukian et al. | |
| 2007/0016676 A1 | 1/2007 | Breuer et al. | |
| 2007/0028000 A1 | 2/2007 | Ebbesen et al. | |
| 2007/0028293 A1 | 2/2007 | Boerries et al. | |
| 2007/0038703 A1 | 2/2007 | Tendjoukian et al. | |
| 2007/0100856 A1 | 5/2007 | Ebbesen | |
| 2007/0100975 A1 | 5/2007 | Srinivasan et al. | |
| 2007/0101021 A1 | 5/2007 | Meyer et al. | |
| 2007/0101022 A1 | 5/2007 | Schulz et al. | |
| 2007/0112880 A1 | 5/2007 | Yang et al. | |

FOREIGN PATENT DOCUMENTS

| | | |
|---|---|---|
| EP | 1 376 990 A2 | 2/2004 |
| EP | 1 376 990 A3 | 2/2004 |
| WO | WO-2004/025421 A2 | 3/2004 |
| WO | WO-2004/025421 A3 | 3/2004 |
| WO | WO-2004/040881 A1 | 5/2004 |
| WO | WO-2004/049104 A2 | 6/2004 |
| WO | WO-2005/011215 A1 | 2/2005 |

OTHER PUBLICATIONS

Meeting Maker, Inc. (2005). "Meeting Maker Millennium Features & Benefits," located at http://www.meetingmaker.com/products/meetingmaker/features_benefits.cfm, last visited on Sep. 27, 2005, 2 pages.

Oracle Corporation. (1993). "Oracle Calendar Synchronization Tools," located at http://calagenda.berkeley.edu/help_training/usersguide/9.0.4-resource_guide/sync_too.htm, last visited on Sep. 26, 2005, 22 pages.

U.S. Appl. No. 11/182,203, filed Jul. 14, 2005 for Schulz et al., 93 pages.

U.S. Appl. No. 11/182,287, filed Jul. 14, 2005 for Schulz et al., 101 pages.

U.S. Appl. No. 11/182,348, filed Jul. 14, 2005 for Breuer et al., 93 pages.

U.S. Appl. No. 11/182,614, filed Jul. 14, 2005 for Boerries et al., 29 pages.

U.S. Appl. No. 11/182,663, filed Jul. 14, 2005 for Meyer et al., 94 pages.

VocalTec Communication Ltd. (Jul. 2004). "Essentra™ Product Suite—General Description," 16 pages.

Official Action issued in connection with U.S. Appl. No. 11/182,663 mailed Dec. 8, 2010.

Official Action issued in connection with U.S. Appl. No. 11/182,663 mailed Jun. 25, 2010.

Official Action issued in connection with U.S. Appl. No. 11/182,203 mailed May 10, 2010.

Official Action issued in connection with U.S. Appl. No. 11/182,203 mailed Oct. 16, 2009.

Official Action issued in connection with U.S. Appl. No. 11/182,203 mailed Mar. 30, 2009.

Official Action issued in connection with U.S. Appl. No. 11/182,664 mailed Mar. 4, 2011.
Official Action issued in connection with U.S. Appl. No. 11/182,664 mailed Sep. 17, 2010.
Official Action issued in connection with U.S. Appl. No. 11/182,664 mailed Apr. 8, 2010.
Official Action issued in connection with U.S. Appl. No. 11/182,664 mailed Sep. 29, 2009.
Office Action issued in connection with U.S. Appl. No. 11/182,348 mailed on Aug. 26, 2009.
Office Action issued in connection with U.S. Appl. No. 11/182,664 mailed on Aug. 5, 2009.
Office Action issued in connection with U.S. Appl. No. 11/182,203 mailed on Dec. 4, 2009.
Office Action issued in connection with U.S. Appl. No. 11/182,203 mailed on Oct. 2, 2008.
Coulouris, G. et al. (1994). *Distributed Systems: Concepts and Design.* Second Edition, Addison-Wesley Publishing Company, pp. 222-233, 311-318.
International Search Report mailed Jul. 11, 2003, for PCT Application No. PCT/US03/07180 filed Mar. 11, 2003, 1 page.
International Search Report mailed Jun. 23, 2003, for PCT Application No. PCT/US03/07179 filed Mar. 11, 2003, 1 page.
International Search Report mailed Oct. 1, 2003, for PCT Application No. PCT/US03/07182 filed Mar. 11, 2003, 2 pages.
International Search Report mailed Oct. 18, 2004, for PCT Application No. PCT/US04/02033 filed Jan. 21, 2004, 1 page.
International Search Report mailed Oct. 8, 2003, for PCT Application No. PCT/US03/07181 filed Mar. 11, 2003, 1 page.
U.S. Appl. No. 11/796,258, filed Apr. 27, 2007 for Yang et al.
U.S. Office Action mailed Sep. 28, 2009, for U.S. Appl. No. 11/182,663, filed Jul. 14, 2005, 26 pages.
U.S. Office Action mailed Oct. 16, 2009, for U.S. Appl. No. 11/182,203, filed Jul. 14, 2005, 22 pages.
U.S. Office Action mailed Sep. 29, 2009, for U.S. Appl. No. 11/182,664, filed Jul. 14, 2005, 20 pages.
U.S. Office Action mailed on Dec. 23, 2009, for U.S. Appl. No. 11/182,348, filed Jul. 14, 2005, 17 pages.
Becker, T. (Mar. 1992). "Transparent Service Reconfiguration After Node Failures," IEEE, London, UK, Mar. 25-27, 1992, pp. 212-223.
Cecchet, E. et al. (2004). "C-JDBC: Flexible Database Clustering Middleware," Proceedings of the USENIX Annual Technical Conference 2004, ten pages.
Lee, B-Y. et al. (2002). "Data Synchronization Protocol in Mobile Computing Environment Using SyncML," IEEE, pp. 133-137.
Liang, D. et al. (2004). "NT-SwiFT: Software Implemented Fault Tolerance on Windows NT," The Journal of Systems and Software 71:127-141.
Miller, K. et al. (2004). "Synchronization of Mobile XML Databases by Utilizing Deferred Views," IEEE, pp. 186-191.
U.S. Office Action mailed Mar. 4, 2009, for U.S. Appl. No. 11/182,663, filed Jul. 14, 2005, 24 pages.
U.S. Office Action mailed Jul. 29, 2008, for U.S. Appl. No. 11/182,348, filed Jul. 14, 2005, 13 pages.
U.S. Office Action mailed Apr. 27, 2009, for U.S. Appl. No. 11/182,348, filed Jul. 14, 2005, 17 pages.
U.S. Office Action mailed Oct. 23, 2007, for U.S. Appl. No. 11/182,203, filed Jul. 14, 2005, 15 pages.
U.S. Office Action mailed Jul. 11, 2008, for U.S. Appl. No. 11/182,203, filed Jul. 14, 2005, 18 pages.
U.S. Office Action mailed Mar. 30, 2009, for U.S. Appl. No. 11/182,203, filed Jul. 14, 2005, 20 pages.
U.S. Office Action mailed Nov. 13, 2008, for U.S. Appl. No. 11/182,664, filed Jul. 14, 2005, 22 pages.
U.S. Office Action mailed May 13, 2009, for U.S. Appl. No. 11/182,664, filed Jul. 14, 2005, 23 pages.
International Search Report mailed on Nov. 28, 2006, for PCT Application PCT/US2006/026303, two pages.

* cited by examiner

ALERT MECHANISM FOR NOTIFYING MULTIPLE USER DEVICES SHARING A CONNECTED-DATA-SET

CROSS-REFERENCE TO RELATED APPLICATIONS

This application is related to the following patent applications: U.S. application Ser. No. 11/182,663, entitled "System and Method for Provisioning a User Device," to Markus Meyer et al.; U.S. application Ser. No. 11/182,348, entitled "System and Method for Servicing a User Device," to Matthias Breuer et al.; U.S. application Ser. No. 11/182,203, entitled "System and Method for Synchronizing between a User Device and a Server in a Communication Network," to Torsten Schulz et al.; U.S. application Ser. No. 11/182,614, entitled "Methods and Systems for Data Transfer and Notification Mechanisms," to Marco Boerris et al.; U.S. Application Ser. No. 11/182,287, entitled "Content Router," to Torsten Schulz et al., which are filed concurrently herewith and are hereby incorporated by reference in their entirety.

FIELD OF THE INVENTION

The present invention relates generally to the field of providing services to one or more user devices in a communication network. In particular, the present invention relates to system and method for notifying a user status of communications between a server and one or more user devices in a communication network.

BACKGROUND OF THE INVENTION

The recent proliferation of electronic devices for communication, information management and recreation has taken routine computing power far away from the desk-bound personal computer. Users are using devices such as cell phones, camera phones, personal digital assistants (PDAs) and navigation systems, not only in the office and in the home, but also in the field and on the road. There is a diverse range of possible applications for such devices, including communication, business, navigation, entertainment and even managing basic daily activities. Many users today only use a single device for a single task, for example, using cell phones for making and receiving phone calls. However, these devices are no longer single-function devices. They are capable of creating various types of data, for instance, electronic mail, voice messages, photos, video, etc. Increasing the number of functions of a device increases the level of personalization to the users. It is desirable to provide users a connected-service to connect and access their data wherever they are, with whatever device they are using and whatever service they are connected to.

One of the challenges of providing such a connected-service to a user is the need of provisioning a mobile device after the user has purchased the product. Traditionally, a user would have to provision the device through a cradle connected to a personal computer. This typically takes place in the home or in the office. Until the provisioning step is completed, the user cannot use the mobile device. Therefore, there is a need for provisioning a mobile device anytime and anywhere.

Another challenge of providing such a connected-service to a user is the need of connecting one or more user devices to a set of settings and data the user has already established in his PC, PDA, cell phone, or other devices. For example, there is a need for a user to clone the set of settings and data from an existing device to a new device upon acquiring the new device. There is a need for the user to repair or replace an existing device with the set of settings and data. There is a need for the user to terminate the service of a user device if the user device is lost, stolen, or temporarily misplaced.

Yet another challenge of providing such a connected-service to a user is the need of notifying the user status of communications to the one or more user devices that share a common set of settings and data. For example, there is a need for notifying the user when there is an overflow condition in the storage of emails, tasks, calendar events, or address book entries at the one or more user devices.

Yet another challenge of providing such a connected-service to a user is the need of maintaining consistency of data among the server and the one or more user devices that share a common set of settings and data. For example, when the service has been interrupted at a server for a period of time, there is a need to synchronize the data changes among the server and the one or more user devices.

SUMMARY

In one embodiment, a system for notifying a user status of communications between a server and the user having one or more user devices in a communication network includes a server for communicating with the user, where the server includes a connected-data-set and the one or more user devices share portions of the connected-data-set, logic for monitoring communications between the server and the one or more user devices for a predetermined set of notification conditions, and logic for sending a notification message to the one or more user devices when a notification condition is detected.

In another embodiment, a method for notifying a user status of communications between a server and the user having one or more user devices in a communication network includes providing a server for communicating with the user, where the server includes a connected-data-set and the one or more user devices share portions of the connected-data-set, monitoring communications between the server and the one or more user devices for a predetermined set of notification conditions, and sending a notification message to the one or more user devices when a notification condition is detected.

BRIEF DESCRIPTION OF THE DRAWINGS

The aforementioned features and advantages of the invention as well as additional features and advantages thereof will be more clearly understandable after reading detailed descriptions of embodiments of the invention in conjunction with the following drawings.

DESCRIPTION OF EMBODIMENTS

Methods and systems are provided for notifying a user status of communications between a server and one or more user devices in a communication network. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description which follows are presented in terms of procedures, steps, logic blocks, processing, and other symbolic representations of operations on data bits that can be performed on computer memory. A procedure, computer-executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, a processor executing instructions, or combinations thereof.

Figure 1A:
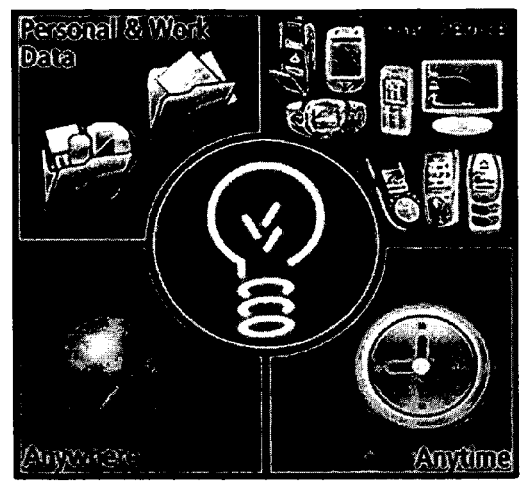
FIG. 1a illustrates a connected-life service according to an embodiment of the present invention.

FIG. 1a illustrates a connected-life service according to an embodiment of the present invention. The connected-life service enables users to share and access their connected-data-set with any device at anytime from anywhere. User devices (also referred to as device or client) may include cellular phones, wireless personal digital assistants, navigation devices, personal computers, game consoles, Internet terminals, and Kiosks. A connected-data-set may include emails, contacts, calendar, tasks, notes, pictures, documents, music, videos, bookmarks, and links.

In different embodiments, the connected-life service provides the following functionalities: 1) repairing a user device, 2) cloning a first user device to a second user device, 3) replacing a first user device with a second user device, and 4) terminating services of a user device. The service of repairing a user device includes resetting states of the one or more user devices, and restoring configurations and settings of the one or more user devices, and restoring the connected-data-set onto the one or more user devices.

The service of cloning a first user device to a second user device includes transferring configurations and settings of the first user device to the second user device, and transferring portions of the connected-data-set to the second user device in accordance with the settings of the first user device.

The service of replacing a first user device with a second user device includes transferring a set of predetermined configurations and settings from the configuration database to the second user device, where the second user device has an identical model, make, and type of the first device, and transferring portions of the connected-data-set to the second user device according to the settings of the second user device. The service of replacing a first user device with a second user device further includes transferring a set of predetermined configurations and settings from the configuration database to the second user device, where the second user device has a different model, make, or type from the first device, and transferring portions of the connected-data-set to the second user device in accordance with the settings of the second user device.

The service of terminating services of a user device includes deleting the configurations and settings of the user device, terminating communications to the user device, and sending termination status to other devices of the user. Note that terminating service of a device not only applies to remove service from the device, it may also be utilized in a "device lost" or "device stolen" scenario. In such a scenario, not only the software and settings, but also the user data (such as mails, attachments, PIM, Photos, etc) may be removed.

In addition, another feature of the device termination service is device blocking. In this scenario, the user cannot find the device but he also does not know for sure if it is lost or just misplaced somewhere, assuming that there still is a good chance the device may be found. In this case, the service offers the user the ability to block the device or to block at least the data service to the device temporarily until further instructions from the user.

Figure 1B:
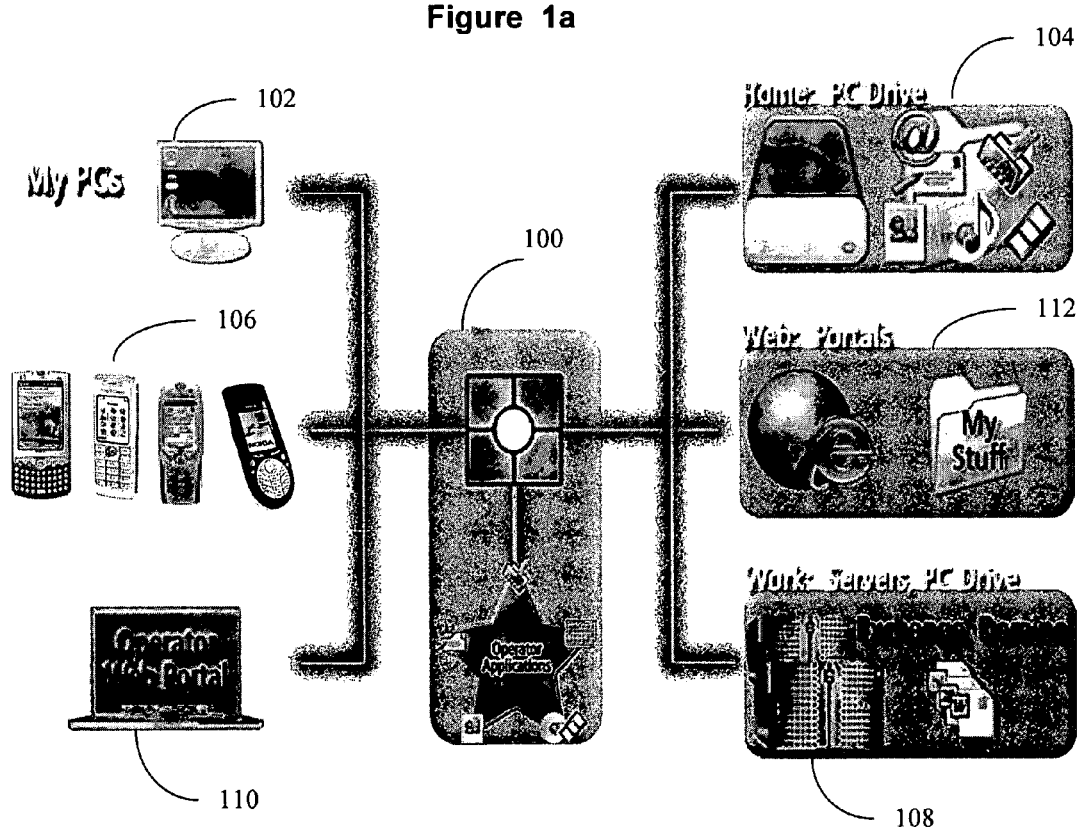
FIG. 1b illustrates a connected-life server in support of the connected-life service of FIG. 1a according to an embodiment of the present invention.

FIG. 1b illustrates a connected-life server in support of the connected-life service of FIG. 1a according to an embodiment of the present invention. The connected-life server 100 may be implemented by one or more computers/servers in different geographical locations. The connected-life server manages the connected-data-set among the different computing devices a user may create or store data, including personal computers 102 and 104, mobile devices 106, servers 108, and web portals 110 and 112.

Figure 2:
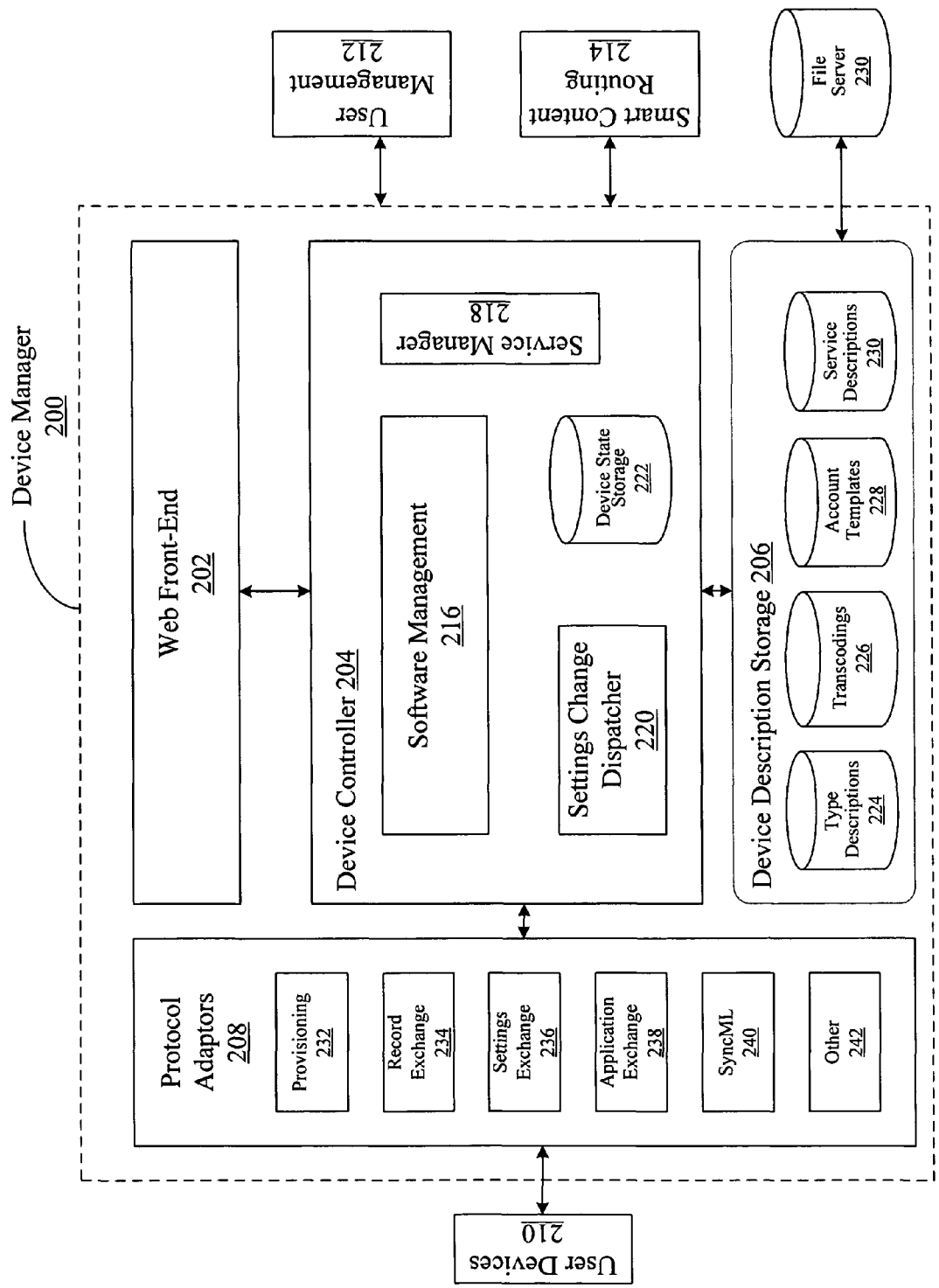
FIG. 2 illustrates an implementation of a device manager of a connected-life server according to an embodiment of the present invention.

FIG. 2 illustrates an implementation of a device manager of a connected-life server according to an embodiment of the present invention. The device manager 200 includes a web front-end 202, a device controller 204, a device description storage 206, and a set of protocol adapters 208. The device manager communicates and manages the user devices 210 through the protocol adapters 208. In addition, the device manager communicates with other portions of the connected-life server through a user management unit 212 and a smart content routing unit 214. Note that the user management unit is used to manage user devices from different services. This unit is optional if all users are from the same Internet service provider, such as the SBC-Yahoo DSL service.

The device controller 204 further includes a software management unit 216, a service manager 218, a settings change dispatcher 220, and a device state storage 222. The software management unit 216 installs, updates, and de-installs records, settings, and applications for the user devices. The service manager 218 manages the types of services supported for the user devices. The service manager provides information to the smart content routing unit 214 for transferring the connected-date-set among the user devices and the connected-life server. The setting change dispatcher 220 provides changes in device settings from the device manager to the user devices. The device state storage 222 stores the information about the operating states of the user devices.

The device description storage 206 stores type descriptions 224, transcodings 226, account templates 228, and service descriptions 230 of the user devices 210 supported by the connected-life service. The device manager transfers such device information between the device description storage 206 and a file server 230. The device manager associates user devices with different combinations of type descriptions, transcodings, account templates, and service descriptions such that each of the combination may be tested and verified for a predefined group of user devices. As a result, different service lines contain corresponding device characteristics and services may be provided to different groups of users.

The protocol adapters 208 may include a provisioning unit 232, a record exchange unit 234, a setting exchange unit 236, an application exchange unit 238, a SyncML unit 240, and other adaptor units 242. Note that the functional units described above (i.e, logical blocks 200-244) may be implemented in a processor executing instructions, hardware, or a combination of thereof. The interactions among the functional units are further described in the following sections.

Provisioning a User Device

In general, these are two ways customers can subscribe to the connected-life service: 1) register account, followed by device provisioning; and 2) register device, whereby the registration of a connected-life service account is included in the procedure (if not already active).

Of the two choices when a user subscribes to the connected-life service, the first is to register an account. The connected-life service is to be offered through service providers who maintain accounts for their customers. This may include, but is not limited to, email accounts, PIM storage and management facilities, and "briefcase" functionality-storage for users' other files, such as photos, music, documents, and other data.

When users register for the services offered by the connected-life service, they are doing so as an already registered customer of the service provider offering them. As such, they already have accounts which are enabled for the connected-life service usage. An implementation of account provisioning is described below. It contains the following sections:

Account Groups

This section describes the different account groups, or account types. Knowing these groups is necessary in order to understand the different account provisioning use cases.

Use Cases

There are three account provisioning use cases. Each is described in the following sections.

Users also have the option to register an account by first registering their devices. Here, as part of the device provisioning process, an account is created automatically.

Account Groups

User accounts can be arranged into groups. Each account group may be provisioned using more than one method. Table 1 shows sample account groups supported by the connected-life service.

TABLE 1

| Account Group | Access Protocol | Description |
| --- | --- | --- |
| Exchange WebDAV | WebDAV (RFC 2518) | Any Microsoft Exchange account whose server exposes WebDAV. |
| IMAP | IMAP | A mail account located on any IMAP server. |
| POP3 | POP3 | A mail account located on any POP3 server. |
| Outlook Redirector | REx | A generic account group used to access the email and PIM data in Microsoft Outlook. |

Use Cases

Account groups can be provisioned for the connected-life service in three different ways. These use cases are explained on the following sections.

1) Provisioning an Un-Configured Account Group

Here, the details of the account the user is registering are, for the most part, not known to the connected-life server (CLS). Therefore, the user enters these details manually, and as such it is only intended for experienced users.

2) Provisioning a Pre-Configured Account Group

When the technical specifications for an account group are already known to the CLS, then the provisioning of accounts can occur in an easy fashion, requiring the least amount of user effort.

3) Provisioning Microsoft Outlook

For users who wish to have accounts located on their own PC, and use their Microsoft Outlook application.

The prerequisite for provisioning an un-configured account group is that the user already has an account from any account group other than Outlook Redirector. The applicable account groups are Exchange, WebDAV, IMAP, and POP3. In this use case, the user specifies all the information required by the CLS in order that it may register the account/data source. This includes such regular parameters as the account username and password, as well as the names of the servers and their respective port numbers.

This is the most complex of all three use cases and is therefore only recommended for experienced users. It may be implemented only when the service provider does not know these data source parameters, for example, if it is offering users to connect to data sources other than those of the service provider.

Figure 3:
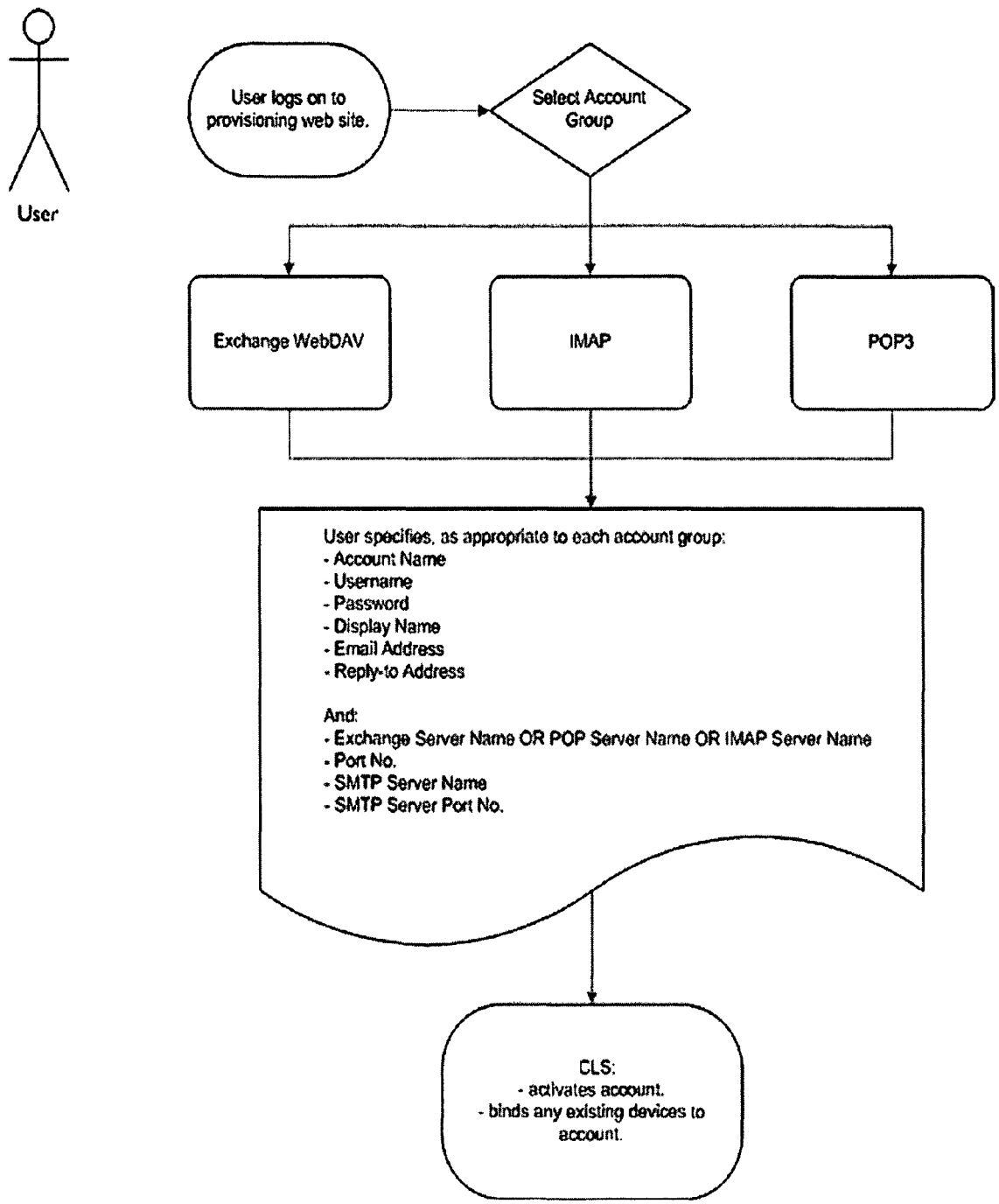
FIG. 3 illustrates a workflow for provisioning an un-configured account group according to an embodiment of the present invention.

FIG. 3 illustrates a workflow for provisioning an un-configured account group according to an embodiment of the present invention. The user 1) logs on to the service provider's website; 2) selects the appropriate account group; and 3) enters all the necessary parameters for the account. Once these steps have been completed, the CLS creates the account.

Figure 4:
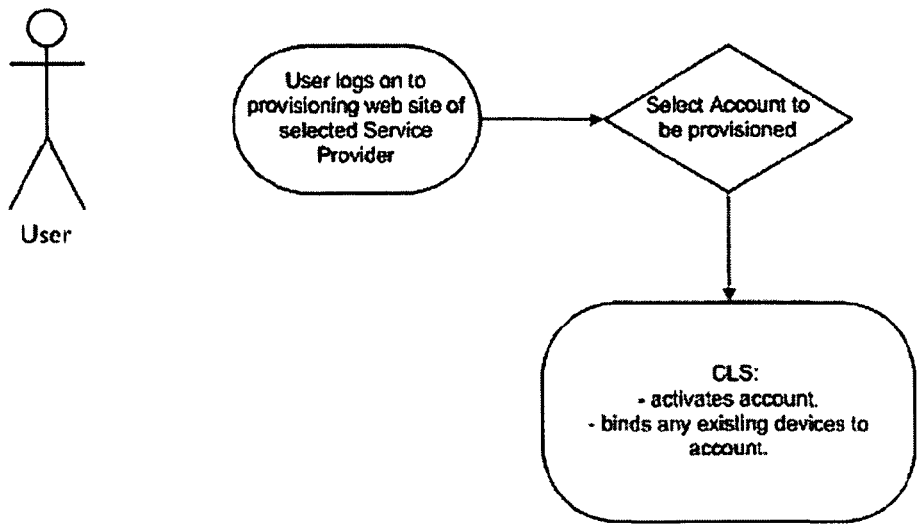
FIG. 4 illustrates a workflow for provisioning a pre-configured account group according to an embodiment of the present invention.

FIG. 4 illustrates a workflow for provisioning a pre-configured account group according to an embodiment of the present invention. The prerequisite for provisioning a pre-configured account group is that the user already has an account from any account group other than Outlook Redirector. The applicable account groups are those offered by the service provider. This use case is based upon knowing most of the account's specifications before the user chooses to register. In contrast to the first use case, this one involves the provisioning of a pre-configured account group. That is, most of the specifications of the account are already known to the connected-life server, and the user merely enters its credentials for the service provider in order to register an account. Specifications like server names, port numbers, and so on are not required to be typed in.

This is an easy way to provision an account. The user is only required to provide a simple answer that "Yes, I want to subscribe to this service" and the rest is handled by the connected-life service. After users log on with their service provider, they select the account they wish to register with the connected-life service.

Figure 5:
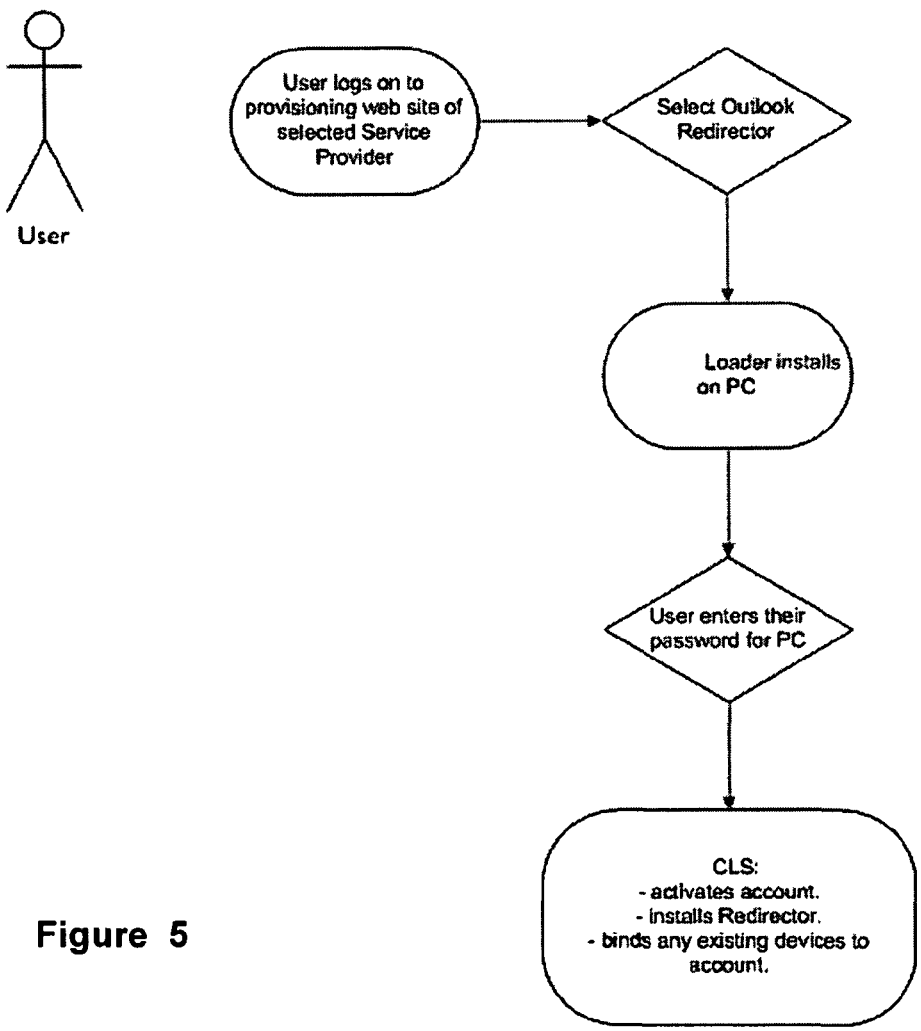
FIG. 5 illustrates a workflow for provisioning Microsoft Outlook according to an embodiment of the present invention.

FIG. 5 illustrates a workflow for provisioning Microsoft Outlook according to an embodiment of the present invention. The prerequisite for provisioning Microsoft Outlook is that the users have Microsoft Outlook installed on their PCs. The applicable account group is the Outlook Redirector.

With this option, the user can select to have their Microsoft Outlook application on their personal computer as a data source. In contrast to Use Cases I and II, where the account is located on the servers of the service provider, the provision of a Microsoft Outlook account means it is located locally, on the user's own PC.

Using this method, the user may still have their Exchange, IMAP, or POP account as a connected-life service account, but the CLS may connect to Microsoft Outlook and not to a provider's server(s). It may connect either to the locally stored data in Outlook's .pst file, or, in the case where Outlook is being used to connect to an Exchange account, to the Exchange profile and through it to the Exchange server. The latter scenario can be used to overcome firewall problems between the CLS and an Exchange server.

Provisioning Microsoft Outlook means installing the Outlook Redirector on the user's PC. The Redirector acts as the intermediary between the data in Outlook's .pst file/Exchange profile and the connected-life server. Note that Outlook can also be provisioned as a device, whose data may be sourced from an account. Details on how devices are provisioned are described in the sections below.

FIG. 5 illustrates a workflow for registering Outlook as a data source according to an embodiment of the present invention. The workflow for registering Outlook as a data source is as follows:
1. The user logs on to the service provider's website.
2. The user selects the Outlook Redirector account group.
3. The Loader is installed on the PC.
4. The user enters the username and password for the PC.
5. The account is activated, and the client software is installed.

Users can provision a device after they have completed the registration of their account. Alternatively, the connected-life service gives users the possibility to register their device and account at the same time (that is, from a user's point of view). The aim is to make the provisioning process as easy and as simple as possible. At the conclusion of the provisioning, the user comes away with an account whose data is connected to their device(s). There are at least four entry points in the device provisioning process:
1. The user receives the Loader software.
2. The user enters via a website. Either the user may log on to the service provider's website, or a sales assistant or customer service representative (CSR) registers the user (in a shop, over the telephone) on their behalf.
3. The user sends an SMS to a number specified by their service provider.
4. The user logs on to the online shop of their provider.

In addition, the user can opt to restore their device, in those cases where the device has lost all or part of its data, or the user loses the device and replaces it with another of the same type. All of these scenarios assume that the customer is already a registered user with the service provider offering the connected-life service. They also assume that if the user has not yet subscribed to the connected-life service, he will be registered according to Use Case II for provisioning a pre-configured account group.

Figure 6:
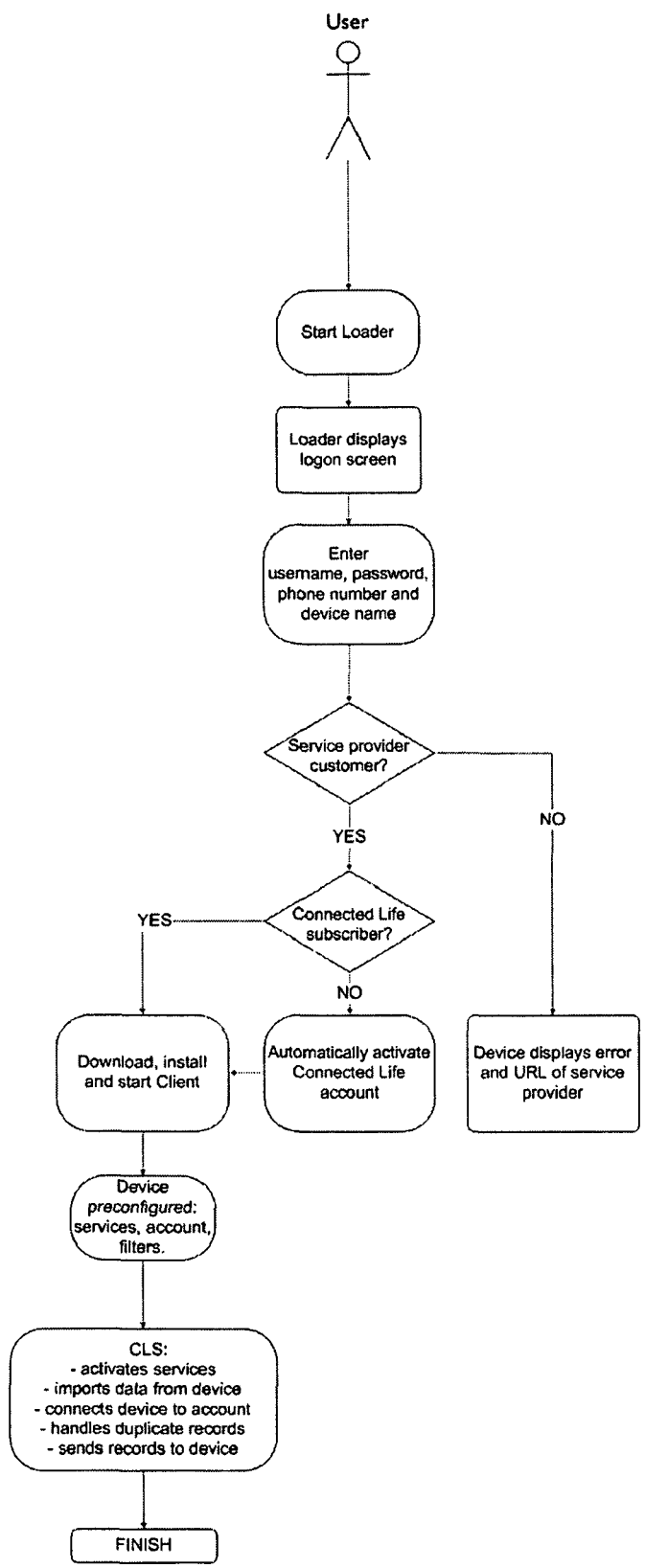
FIG. 6 illustrates a workflow for provisioning a device via a pre-installed Loader according to an embodiment of the present invention.

FIG. 6 illustrates a workflow for provisioning a device via a pre-installed Loader according to an embodiment of the present invention. One way in which a user can register their device for the connected-life service is through the installation of the Loader application on their device. The Loader is an application that facilitates the provisioning of the device and the installation of the client software.

The Loader may be made available to users in a variety of ways, including via download, CD-ROM, SD or other memory card, or any other method of transmitting the loader to the device. Loaders are labeled (with version numbers) for specific device types. Hence, when the device connects to the CLS for registration, the server will automatically know the device type and whether the client software needs to be installed. The steps for provisioning a device via a pre-installed Loader are:
1. The loader starts on the device.
2. The loader displays a service provider logon screen.
3. The user enters their account username, password, and a name for their device (e.g., My Phone).
4. If the user is not yet a customer of the service provider, a message is displayed asking the user to contact the provider.
5. If the user is not yet a subscriber to the connected-life service, their account will be automatically activated.
6. Once the user has provided their account credentials, the Loader will download the client software, which has been configured with pre-determined services (like the data types that will be exchanged) as well as default filters. The download can be either over-the-air or via a PC connection, or simply transferred from a local memory card.

7. The CLS activates the services on the device. It imports the existing data from the device (default operation) and connects the device to the account. It performs any duplicate handling necessary with records in the account, before sending records from it to the device.

The device is now provisioned and ready to exchange data.

Figure 7:
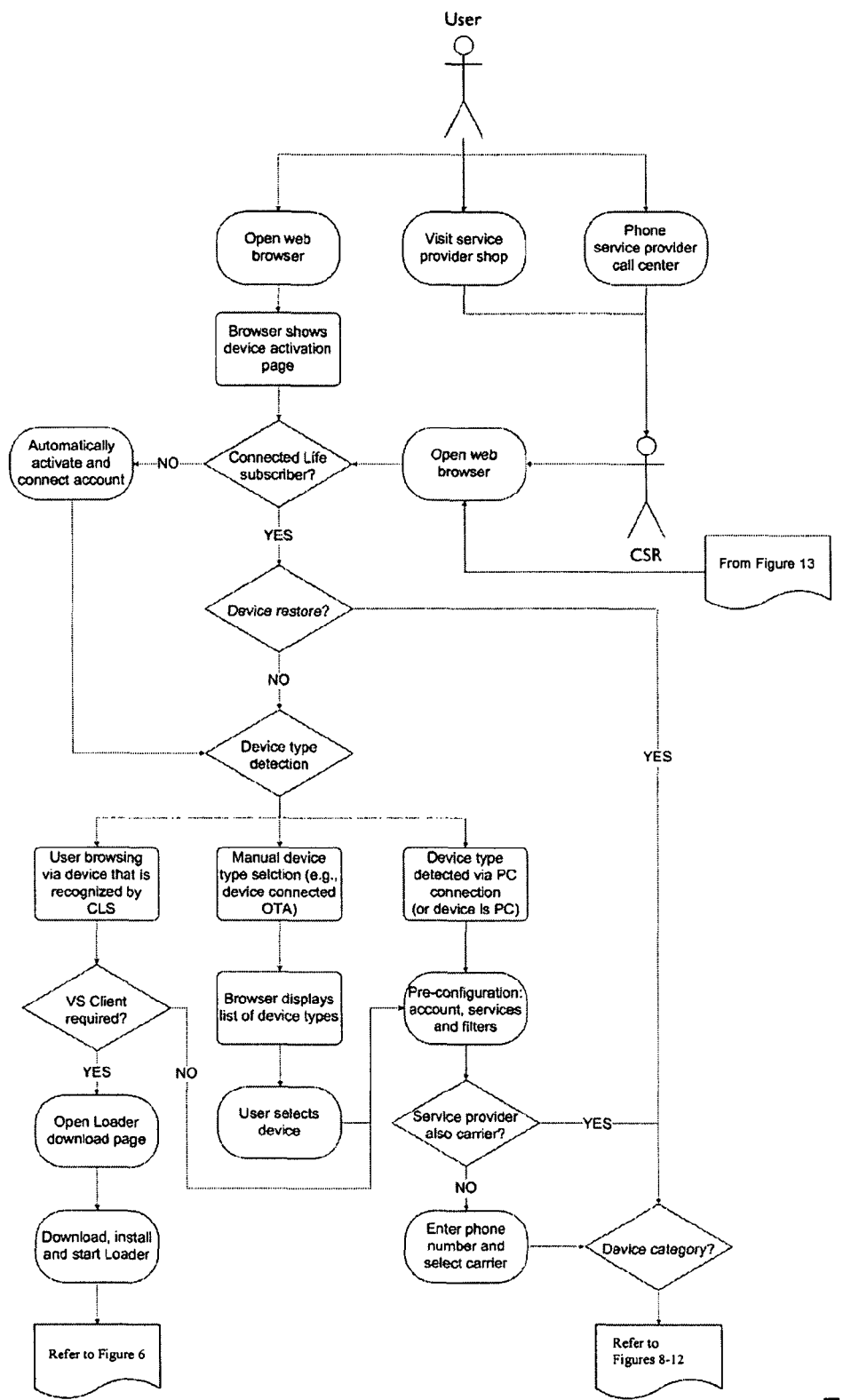
FIG. 7 illustrates a workflow for provisioning a device via a website according to an embodiment of the present invention.

FIG. 7 illustrates a workflow for provisioning a device via a website according to an embodiment of the present invention. In this scenario, the user registers their device for the connected-life service using a web browser. This can be either:

Directly, via the service provider's website available to their customers. The user logs in.

Via a CSR. Typical scenarios include the user calling a service/sales hotline or the user visiting one of the service provider's shops, where a sales assistant may proceed to register the customer on their behalf.

There are two stages to provisioning a device using a web browser: 1) pre-provisioning, and 2) provisioning the device. Before the provisioning process begins, the CLS determines what kind of device is being provisioned and how it is currently connected (via PC, wireless). It also knows whether the provisioning is new or whether the user wishes to restore the device. A device restore is necessary when it has been lost and replaced by a new one, has been hard reset and lost its programs and data, or has lost data some other way.

Device restores are not necessary if the device has lost data of a type that it exchanges with the CLS, nor if the device has been backed up to a previous configuration. In the former case, a regular data exchange will occur and the lost data retrieved from the account. In the latter case, a slow sync will be initiated to get the device back to the current state of the account. In other words, if the client software is deleted, a restore is required. The server requests all data from the device in question, compares all records with the inventory to identify mismatches, and updates the device with the records from the inventory. Note that device restores do not apply to push devices.

In the event the server is out of sync with the user device and a backup of the server side inventory is restored, the slow sync process may be optimized by keeping a checkpoint marker (for example a time stamp) on the device every time a backup of the server side inventory is done. This allows the server to compare only those records that have changed after the checkpoint marker. This method reduces the amount of data need to be transferred to the user device. Thus, it shortens the duration and lightens the transmission bandwidth usage of the slow sync process.

The provisioning process itself is dependent on the type of device being registered. In this regard, it falls into five categories:

1. Push device with verified phone number.
2. Push device without verified phone number.
3. ActiveX-enabled device.
4. Device using the client software.
5. Device using own sync stack.

These processes are described in detail in the following sections.

The steps for pre-provisioning a device via a website are:

1. There are numbers of ways a user may start the provisioning of their device through a website. The user may call the service provider's call center, visit one of their shops, or browse their website directly. In all cases the provisioning is performed via the web.

2. As in the first use case where the user installs the Loader, if the user does not yet have a connected-life service account, then this is automatically created.

3. If the device is being restored (for example, due to a hard reset), then the device is provisioned according to the device category.

4. The rest of the pre-provisioning process depends on how the device is detected by the CLS, which is in many ways related to how the device is currently connected. FIG. 7 shows three possibilities:

a. User browsing using device.
      In this case, the CLS will detect the device type and can direct the user to the Loader download page. The loader is then started by the user, and the provisioning process continues as shown in FIG. 4.

b. Device type detected via PC connection (or device is PC).
      Here, either the device is connected to the PC, or the device being provisioned is the PC itself. The administration application can detect the device type through this connection, using an ActiveX control. For devices connected via a PC, the provisioning will occur over it.
         i. The account, services, and filters are configured (performed partly by the user or fully automatic).
         ii. If the service provider is not the carrier, the phone number for the device is entered. If the provider and carrier are the same, then the number is already known.

c. User manually selects device type from menu.
      It is assumed here that the device either is connected wirelessly or, if connected to the PC, cannot be detected for some reason. The provisioning process can occur over the air, via the device's memory card, or through some other method.
      As the device cannot be automatically detected, the user manually selects the device type from a list. Once done, the pre-configuration of the account, services, and filters occurs (refer to 4.b.i., above), and the process continues from there.

5. The pre-provisioning process is now complete. The provisioning itself now begins, based on the device type and described in the following sections.

In another example, the pre-provisioning is used to restore a device. The connected-life service offers the possibility of restoring a device in the event that:

The device is replaced with another of the same type (due to theft, damage, etc.).

The device has been reset, or in some other way has lost its connected-life service configuration.

In these cases, the device (or the replacement device) can be restored. The pre-provisioning process proceeds through the steps—the user, device, and its previous configuration are already known to the server. The provisioning process can commence based on the device category.

Figure 8:
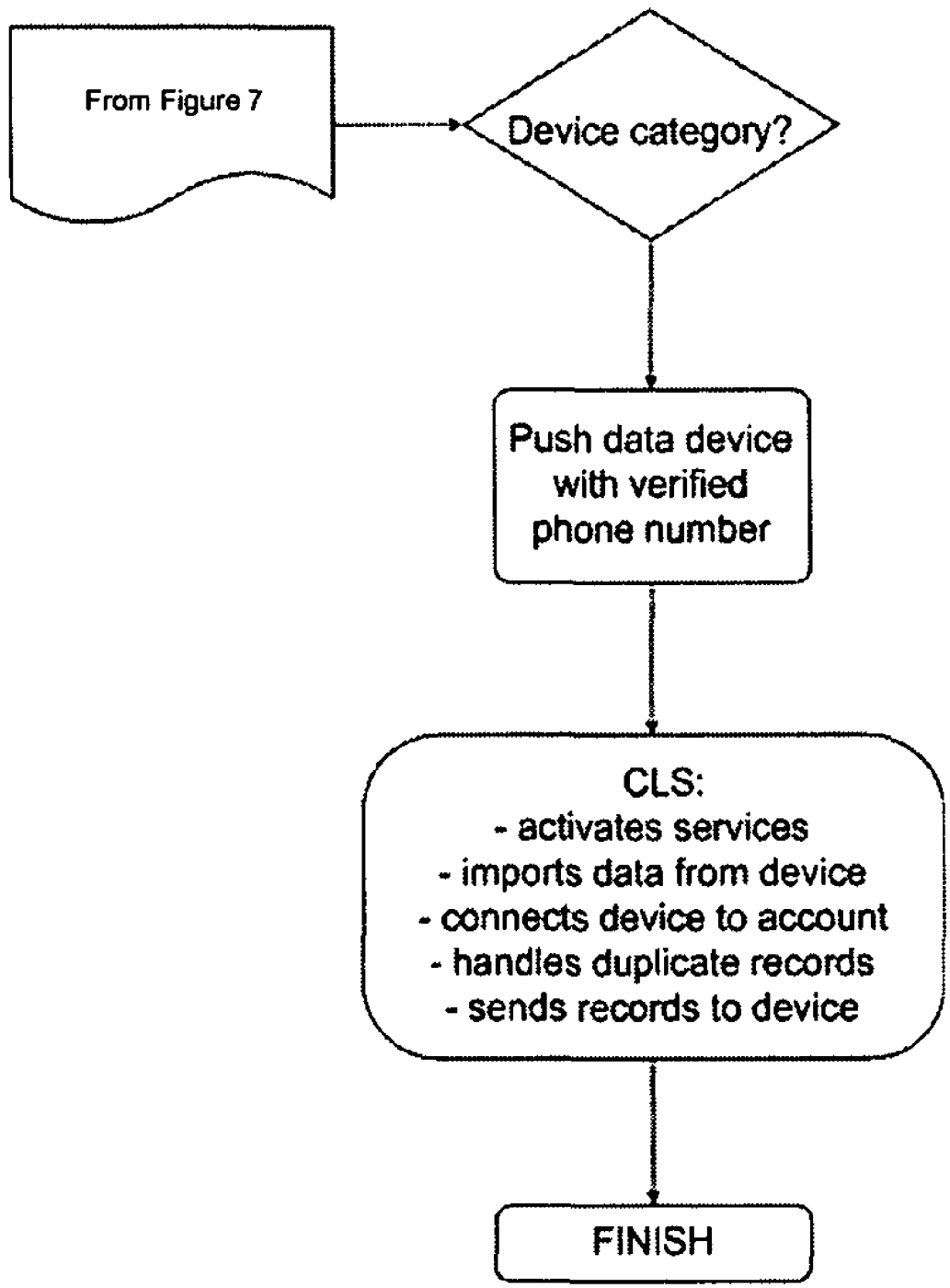
FIG. 8 illustrates a workflow of device provisioning via website with verified phone number according to an embodiment of the present invention.

FIG. 8 illustrates a workflow of device provisioning via website with verified phone number according to an embodiment of the present invention. The workflows described here and in the next section, "Workflow—push device without verified phone number," apply to so-called "push" devices, or in other words, MMS devices. It offers the most basic level of data exchange, and is one-way. In essence, data is pushed to the device by the CLS. The data is not intended to be changed by the user on the device, and any changes made are not sent back to the CLS. Email is an example of one data type that may be pushed to devices.

These devices do not require any software to be installed for use with the connected-life service. In the provisioning process shown in Figure DP6, once the pre-provisioning process is completed, it is just a matter of activating the services for the device and sending it data. In this use case, the device's phone number has already been verified by the CLS. Verification of the phone number is performed for security reasons, to ensure that data is sent to the right device.

Figure 9:
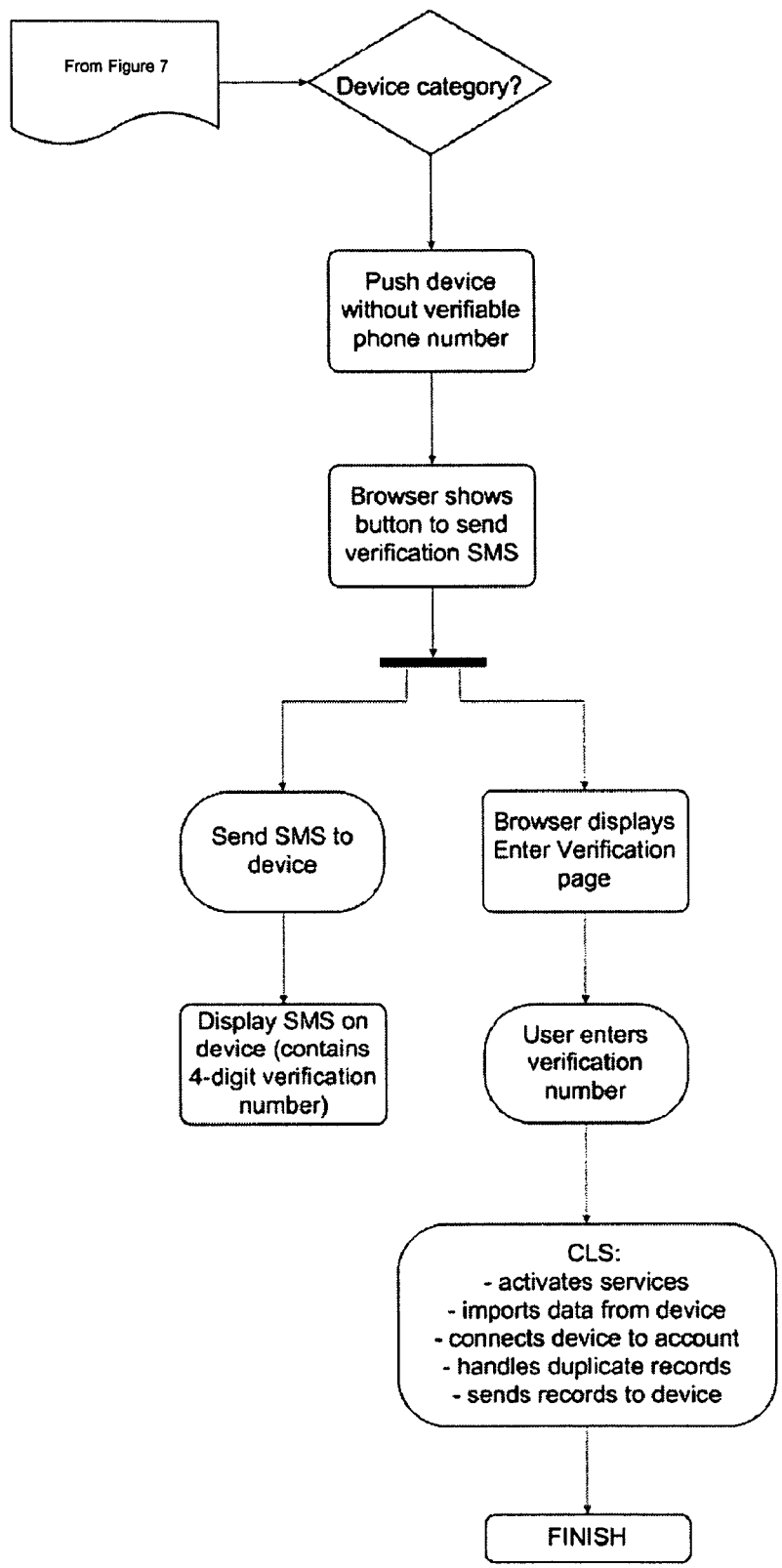
FIG. 9 illustrates a workflow of device provisioning via website without verified phone number according to an embodiment of the present invention.

FIG. 9 illustrates a workflow of device provisioning via website without verified phone number according to an embodiment of the present invention. In this use case, the device is a push device (as above), but its phone number may still be verified. This process forms the main part of its provisioning, and once this has been done and its services activated, the device is ready to go. The phone number verification process is as follows:

1. The user enters the phone number and clicks OK to send an SMS to it.
2. The SMS is sent to the device. It displays a 4-digit verification number.
3. At the same time, the browser opens a page for the user to enter this verification number.
4. The user enters the verification number.
5. Once confirmed, the CLS then proceeds to activate the services for the device, and the provisioning process is completed.

Figure 10:
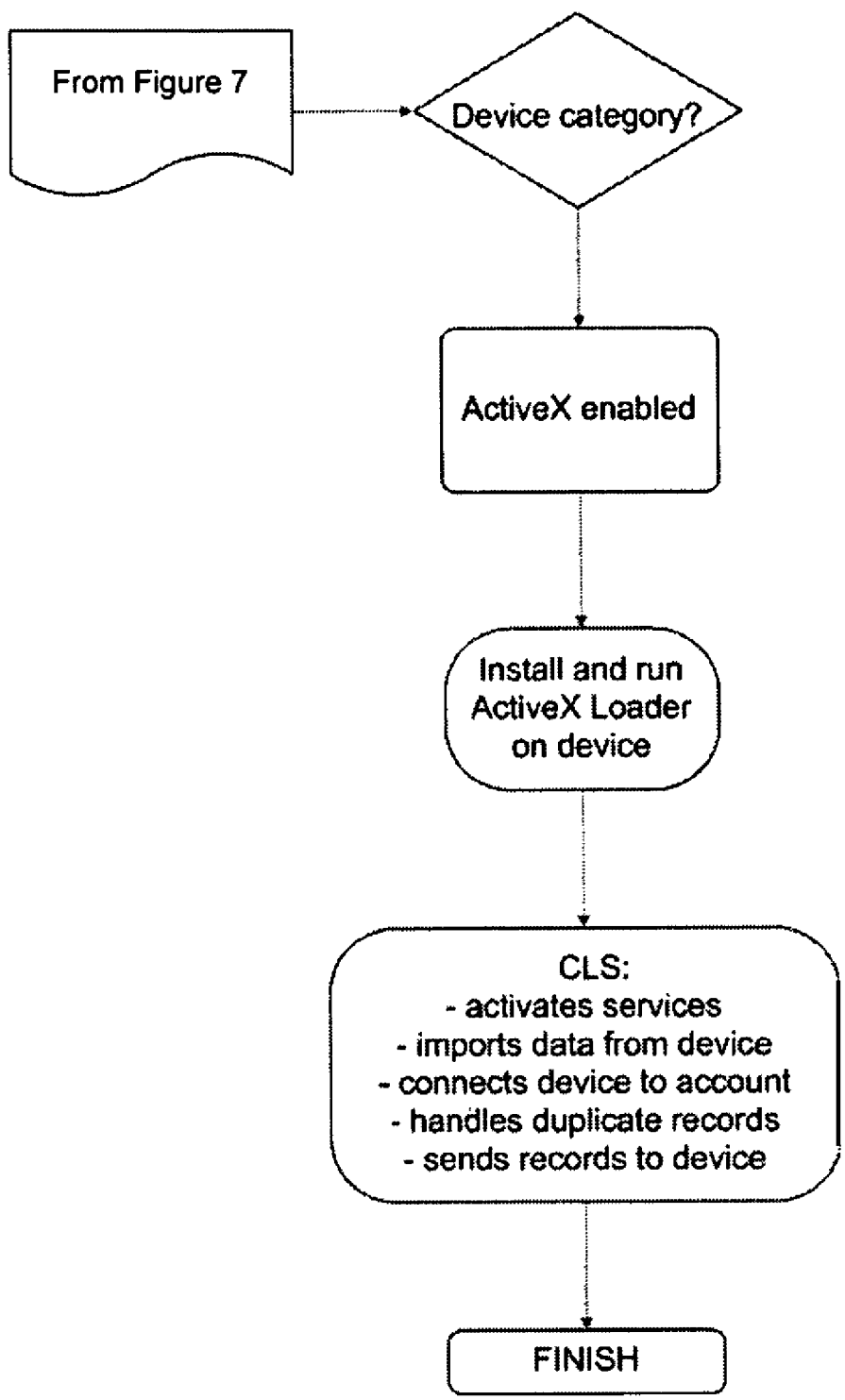
FIG. 10 illustrates a workflow of device provisioning via website for an ActiveX device according to an embodiment of the present invention.

FIG. 10 illustrates a workflow of device provisioning via website for an ActiveX device according to an embodiment of the present invention. This provisioning workflow applies to the following devices:

PCs with ActiveX-enabled web browsers.
Handheld devices connected to such a PC.

The Loader includes an ActiveX control that allows the CLS to detect the device type and to install the client software. It also authenticates the device with the CLS, permitting the client software download.

Figure 11:
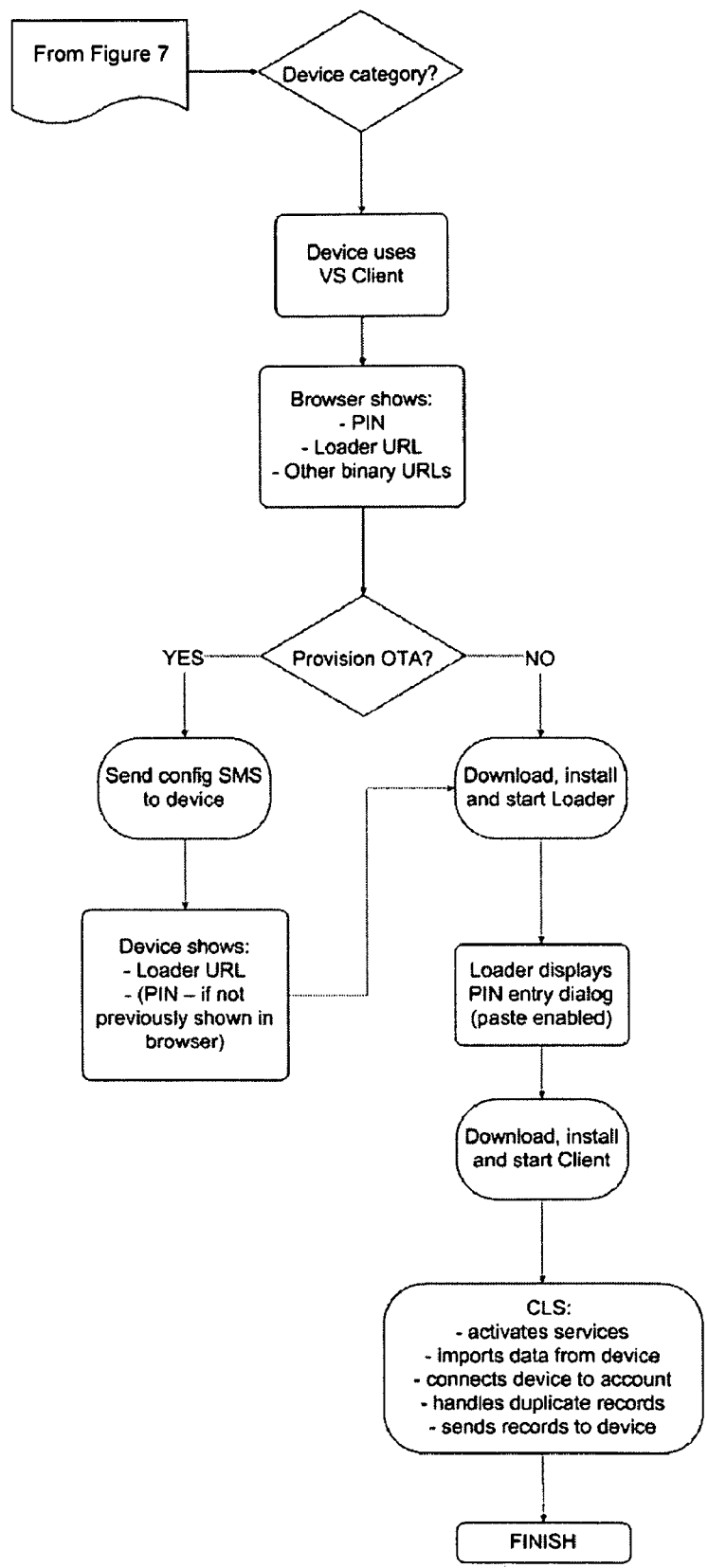
FIG. 11 illustrates a workflow of device provisioning via website using the client software according to an embodiment of the present invention.

FIG. 11 illustrates a workflow of device provisioning via website using the client software according to an embodiment of the present invention. This workflow applies to devices that require installation of the client software. The procedure is as follows:

1. The browser displays the URL of the Loader as well as a unique PIN for the user. In addition:
    a. For CSRs, the browser will also display the URLs of any other available binaries.
    b. For developers, the browser gives them the option of entering in the URLs of the CLS installation and the Loader, as well as those of other binaries that need to be installed.
2. Regular users will jump straight to the Loader installation:
    a. If it is to be installed over the air, the CLS will send a configuration SMS to the device that includes the URL for the Loader. Opening it starts the download.
    b. If the device is connected to the PC, the Loader will download and start automatically.
    Both of these steps require the user to enter in the previously displayed PIN for authentication purposes.
3. After the Loader is started, it will download, install, and start the client software.
4. The device services will be activated, data imported from the device (if selected), duplicate records handled by the CLS, and records from the account sent to the device. The provisioning process is complete.

Figure 12:
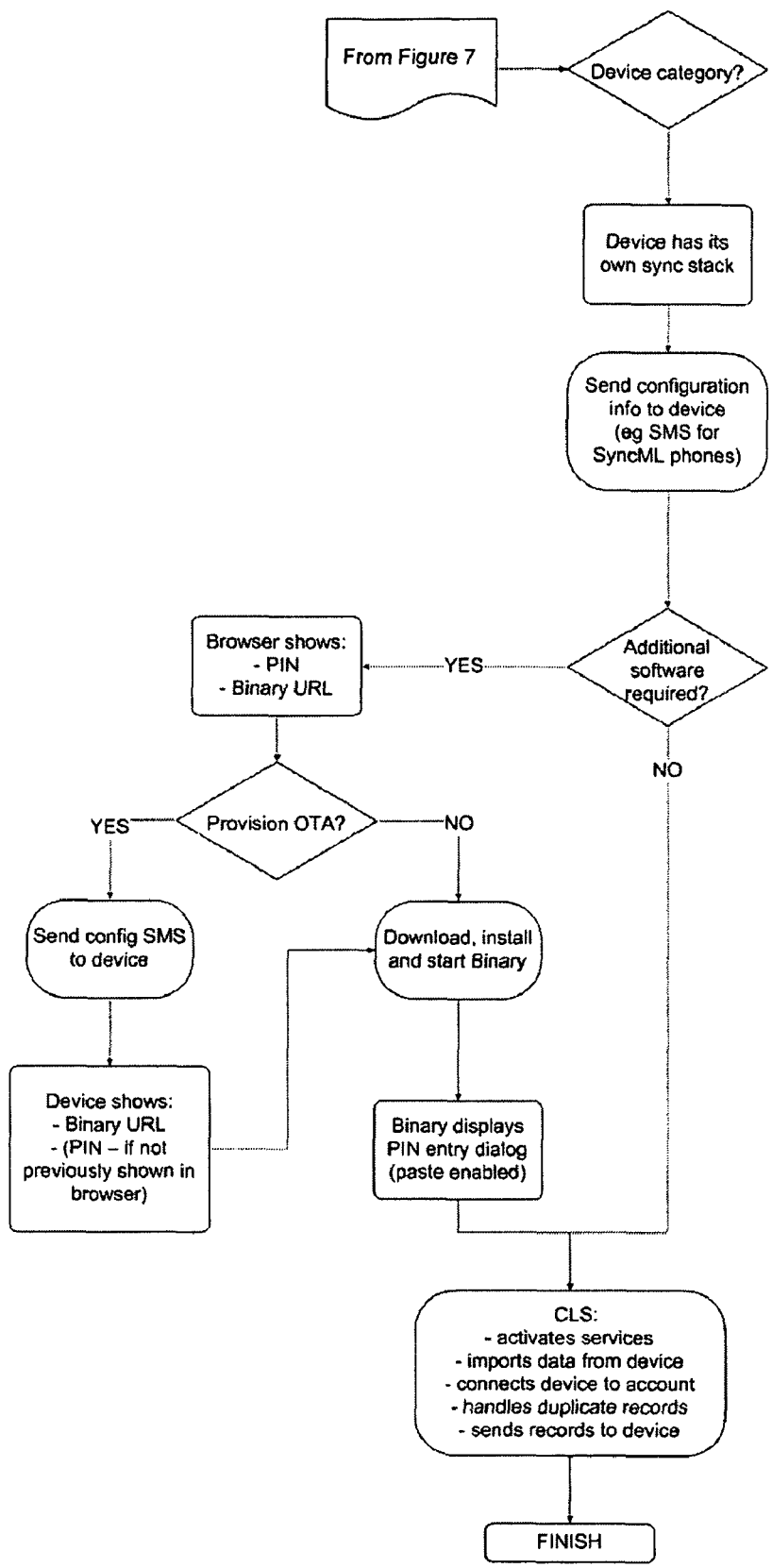
FIG. 12 illustrates a workflow of device provisioning via website using existing sync stack on the device according to an embodiment of the present invention.

FIG. 12 illustrates a workflow of device provisioning via website using existing sync stack on the device according to an embodiment of the present invention. This workflow applies to those devices that have their own synchronization stack, for example, SyncML devices. In this case the client software does not need to be installed. The workflow for most devices is quite simple. Only a configuration SMS needs to be sent to the device that specifies the server name, port number, and so forth. Once done, the provisioning continues in the normal way by activating services and starting the exchange of data.

In the case where a device needs additional software to be installed, the procedure followed is basically the same as that for the installation of the Loader shown in FIG. 9. That is:

1. The browser displays the URLs of the binaries as well as a unique PIN for the user. In addition:
    a. For CSRs, the browser will also display the URLs any other available binaries.
    b. For developers, the browser gives them the option of entering in the URLs of the CLS installation, the Loader, as well as those of other binaries that need to be installed.
2. Regular users will jump straight to the binary installation:
    a. If it is to be installed over the air, the CLS will send a configuration SMS to the device that includes the URLs for the binaries. Opening it starts the download.
    b. If the device is connected to the PC, the binary will download and start automatically.
    Both of these steps require the user to enter in the previously displayed PIN for authentication purposes.
3. The device services will be activated, data imported from the device (if selected), duplicate records handled by the CLS, and records from the account sent to the device. The provisioning process is complete.

Figures 13, 14:
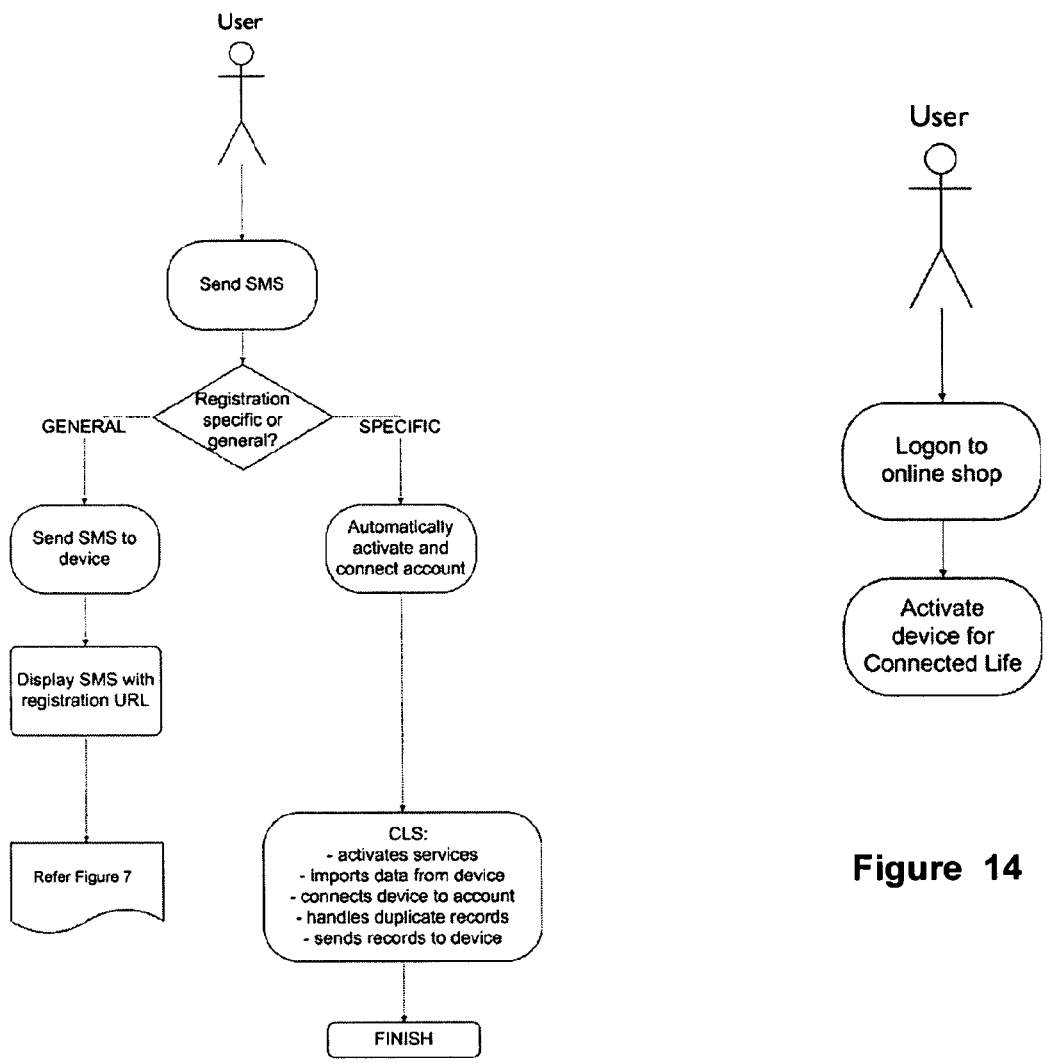
FIG. 13 illustrates a workflow of device provisioning via SMS according to an embodiment of the present invention.
FIG. 14 illustrates a workflow of device provisioning via online shop according to an embodiment of the present invention.

FIG. 13 illustrates a workflow of device provisioning via SMS according to an embodiment of the present invention. This use case offers a simple provisioning process, in terms of the user's experience. Here the service provider may cater the connected-life service to specific device types and allow the user to simply send an SMS to a designated number, whereupon their account is activated for connected-life use, if it is not already, and the device provisioned automatically, requiring a minimum amount of user interaction. This workflow represented in FIG. 13 (under the specific branch) may be tailored to meet the requirements of the service provider and the device type(s) that may be provisioned. Alternatively, as shown under the general branch, upon sending an SMS, the CLS may return the URL for the user to browse to and provision the device as described in the Via Website use case.

FIG. 14 illustrates a workflow of device provisioning via online shop according to an embodiment of the present invention. In this provisioning scenario, the device already meets the technical requirements for use with the connected-life service. The user has an account with the service provider (but not necessarily the connected-life service). All that the user does is to log on to the provider's website and activate the connected-life service. The provisioning is done automatically.

Record Exchange (REx) Application Program Interface

The Record Exchange API is designed to provide the functionality used in the SyncML (session-based) protocol. To accomplish this, the number of steps required and the commands used for accomplishing those steps are reduced. In the SyncML model, a process flow is described below:

Authenticate
Start session
Initialize sync session (negotiate sync type per database type)
Client sends records to the server (may require multiple messages)
Server performs a synchronization between the client's data and its own
Server acknowledges client's records and sends records to the client (may require multiple messages)
Client acknowledges the server's records
End session As mentioned above, the entire session completes successfully in order for the synchronization operation to be considered successful. This makes the overall process error-prone primarily due to network connectivity and device stability issues.

The Record Exchange API addresses the integrity problem of the SyncML (session-based) sync by breaking up the process into discrete operations that can be performed, for the most part, independently of one another. The concept of synchronization is divided into its two constituent parts: putting and getting items from the client's perspective and the concept of initialization can be combined with either of these actions. So instead of using actions in a process with cascading dependencies, a typical sync using the Record Exchange API is described as:

The client initializes the data types it wants to use and sends items. The server sends an immediate response for this request. The server can indicate in its response whether there are items pending for the client. This step can be repeated as many times as the client deems necessary.

The client initializes the data types it wants to use and requests items from the server. The server returns pending items to the client and indicates if there are still more pending. The client can repeat this step and include acknowledgement information.

Although there are only two steps shown above, the Record Exchange API provides different functions for carrying out different parts of those steps. Client devices can use a put/get process or a more detailed process that includes separate init and acknowledgement steps as desired. Each of these steps is discussed in more detail below.

Figure 15:
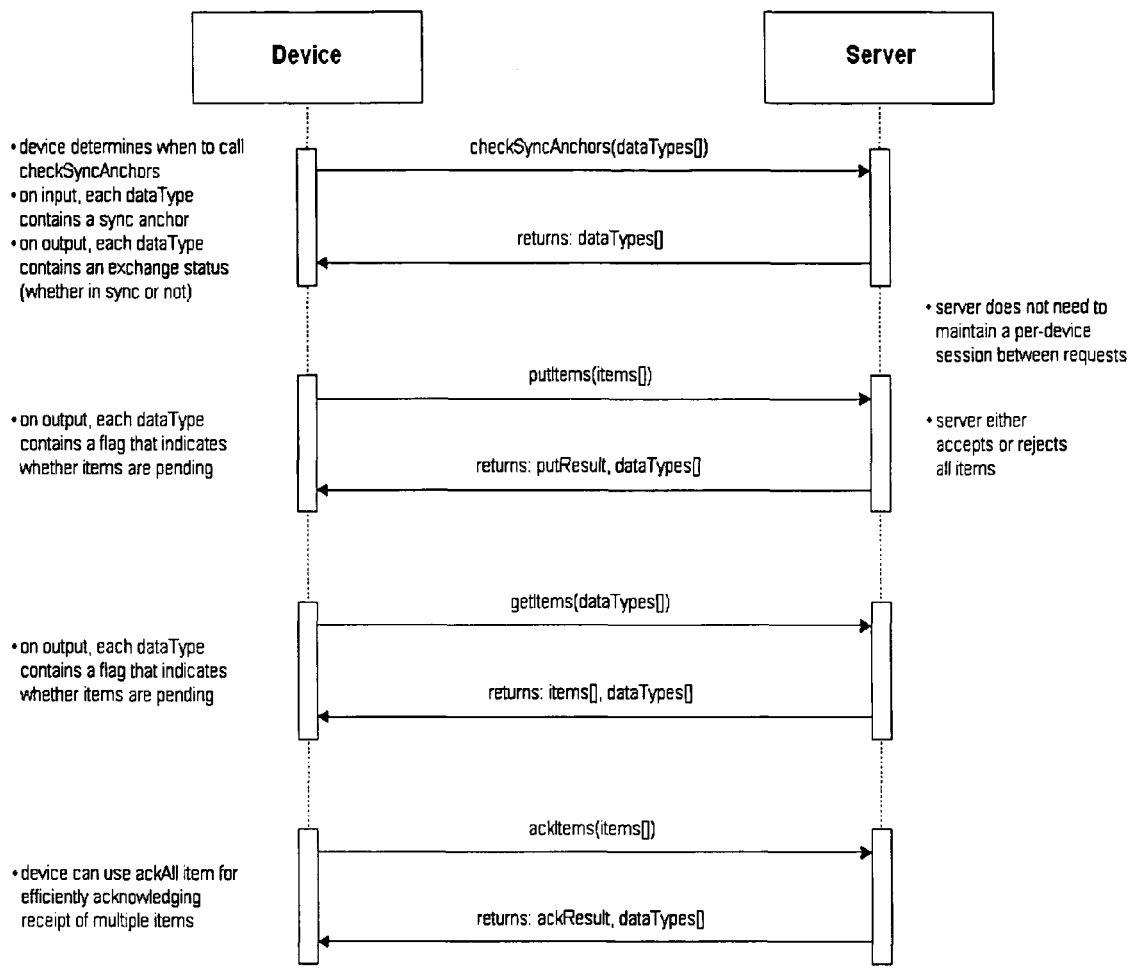
FIG. 15 illustrates an overview of the REx Protocol flow.

FIG. 15 illustrates an overview of the REx protocol flow. In order to support protocol changes and provide backward compatibility with older devices, the device sends the current protocol version as URL parameters together with each request.

Exchanging Records

Every item exchanged through the REx API is addressed. To accomplish this, the REx API defines several components that comprise a unique reference to an item. Not all of the components are used in every situation, but for any given item, the supplied addressing information needs to be sufficient to uniquely identify that item. The addressing components defined in the REx API are data source, data type, and record ID.

Of these components only the record ID is mandatory. For the other two it is possible that their value will be implied in the operation being performed, in which case they can be omitted. The data source component is used to allow clients to create new items in different data sources, if a client has the ability to determine the valid data sources and possibly also be able to allow the user to select which one to use.

Although the names of these components originate from the original domain of the REx API, they can be used for any addressing requirements. The record ID can be a setting path function, for example. Note that for certain data types the record ID is optional. In these cases the record ID may be omitted. Within each response from the server, there is one item for each record ID.

Clients send records to the server using the putItems call. This function takes as parameters an array of ExchangeItems. The server responds to each putItems call with an ExchangeResult structure that contains an array of data types that have pending changes and an acknowledgement for the received items. One requirement is that clients acknowledge all items received from the server before calling putItems.

At any time the client can query the server for pending items by sending a getItems request. This call examines the contents of the item cache and returns any records that are pending for the client. To facilitate an optimal exchange of items and status, a client can include acknowledgement information when getting new items by using the ackAndGetItems call. The format of the acknowledgement information is described below.

In response to each getItems call, the server returns an ExchangeResult that contains, among other things, an array of ExchangeItems containing the contents of the pending items and an array of DataTypes that indicate which data types have more items to be retrieved.

To optimize the flow of items from the server to the client, the server will always send delete items before add and replace items. The requirements of the getItems request include:

Clients send all pending changes, via putItems, to the server before calling getItems;
Clients include a limit value that the server will use to determine how much information to return in response to each getItems call; and
Clients call ackItems immediately following a getItems call.

Items are acknowledged in both directions so that the client and server know when an item has been successfully processed. Note that the terms ack and acknowledge are used interchangeably throughout this document. There are two ways to acknowledge the receipt of an item through getItems: via an individual ack or via an ack all ExchangeItems. Failure acks always require an individual ack ExchangeItem so the exact item and cause of failure can be identified. Ack all ExchangeItems are handled such that all items that are received before the item being acknowledged are interpreted as successfully processed. The Ack-all-items method contains a valid data type name. This implies that a separate ack-all-items is required for each data type involved in an exchange.

The server does not return any ack items in response to a putItems call. Instead it returns an overall result response for the entire putItems call. In other words, the processing of the items in a putItems call is an all-or-nothing operation. For this reason the item ref value is not used when acknowledging items sent from the client. Clients omit this value from the ExchangeItems they send to the server. It is recommended that clients send ack-all-items as soon as possible so the server will have the most accurate state representation of the client.

Clients that cannot or chose not to store the proposed record IDs can send back map commands that contain the (temporary) Locate Unit ID (LUID) proposed by the server and the LUID that represents the record on the client. Clients send map commands to the server by passing ExchangeItems in an ackItems call. Map commands can be sent at any time and can be sent any number of times (in the case of communication failures), and are not interpreted as an implicit receipt acknowledgement of items. Note that clients may still explicitly pass an ack item even for items are that are ID mapped. Clients may use the server's record IDs until they have sent map commands to the server.

To map the IDs, the client echoes back ExchangeItems received from the server, after changing the item type and replacing the data member with the client's LUID. In one embodiment, an example of ExchangeItem sent from the server is shown below:

```
struct ExchangeItem
{
    itemRef = 100
    itemType = 1      // add
    dataTypeName = contacts
    recordID = LUID
    data = contact_data
}
```

The client may return a map command like this:

```
struct ExchangeItem
{
    itemRef = 100
    itemType = 5      // map
    dataTypeName = contacts
    recordID = old LUID
    data = new LUID
}
```

Record Exchange Data Structures

In one embodiment, examples of data structures of the REx are shown below.

```
struct DataType
{
    string dataTypeName
    string syncAnchor              optional
    string pendingSyncAnchor       optional
    int    exchangeStatus optional
}
struct ExchangeItem
{
    int    itemRef           see note below
    int    itemType          see note below
    string dataSource        optional
    string dataTypeName      optional
    string recordID          optional
    string jobID    optional - used by Get, Query & Query Result
    int    result   optional - used to acknowledge changes
    Value  data     optional - type is any valid XML-RPC type
}
```

ItemRef is a unique identifier that the server uses to reference an item it sends to the client. The client uses this value to acknowledge items it has received from the server. ItemRefs are a monotonically increasing sequence of integer values. The server maintains a sequence for each data type.

The device can also mark commands which it sends to the server with a monotonically increasing sequence of itemRef values. When a connection between the server and the device is interrupted, the server detects re-send commands by examine the itemRef values and ignores already received commands. The device maintains an itemRef sequence for each data type for which it supports commands with itemRef values. The device ensures that it sends according to data type for all or for non-commands an itemRef value.

In one approach, valid item types are listed below:

```
Add             1
Replace         2
Delete          3
AddOrReplace    4    only valid from device to server
Map             5    not stored persistently
Get             6
Ack             7    not stored persistently
Ack All         8    not stored persistently
Query           9
Query Result    10
Query End       11
Clear           12
GetResult       15
```

Data Contents:
Record content of the data—for adds and replaces
NULL—for deletes unless additional information is required to perform the delete operation (as in some preference management cases)
Record LUID—for maps
Optional filter—for Query commands

```
struct ExchangeResult
{
    int               result
    DataType[ ]       dataTypes    optional
    ExchangeItem[ ]   items        optional
}
```

The REx API is a flexible protocol for exchanging records or data. However, despite the flexibility built into the REx API, there will be situations where the core type definitions do not provide all of the required information. One way to resolve this issue is to define custom types based on the core type definitions that the API provides. This is handled since REx is based on XML-RPC. All of the structures defined in the REx API are transferred as structures in the XML-RPC format. XML-RPC structures can be viewed as a collection of name/value pairs. To extend a structure, a new name/value pair is added.

The REx API parser builds generic XML-RPC objects and passes them to marshaller functions that reside in protocol handler classes. The core REx API functions reside in a single protocol handler, but it is possible to define custom protocol handlers that inherit the entire core REx API functions while providing specialized functions for their own purposes. These specialized functions can marshal the parameters they receive and handle extended types appropriately. An example of an extended type is shown below:

```
struct DMExchangeItem extends ExchangeItem
{
    string    dataTypeID   used to provide additional addressing
                           information in the form of mapping
                           information
}
```

The above structure may be passed anywhere an ExchangeItem is expected, but functions that understand the DMExchangeItem type can also search and use the dataTypeID information.

Record Exchange Statuses and Result Codes

Table 2 defines the valid exchange statuses and result codes. Note that not all values listed are applicable in all cases. Consult the individual function definitions for the exact values that apply to each function.

TABLE 2

|  |  | Device to server acks item result | Device to server initRefresh data type exchange status | Server to device data type exchange status | Overall result |
|---|---|---|---|---|---|
| 200 | OK (generic successful result) | x |  | x | x |
| 201 | OK (records pending); the server is not forced to send 201 even when it has changes |  |  | x |  |
| 250 | Exchange refresh (client will be restored from data source records) |  | x |  |  |
| 300 | The device is in the zombie mode |  |  |  | x |
| 400 | Bad request (generic request error) | x |  | x | x |
| 401 | Unknown external user ID (this overall error code is only valid for devices which do not use the security servlet to send the request to the server) |  |  |  | x |
| 404 | Unknown data type | x |  | x |  |
| 410 | The server does not support the client protocol version |  |  |  | x |
| 417 | Refresh required (e.g. sync anchor mismatch) |  |  | x |  |
| 420 | Device full (the device ran out of memory/"disk" space/...) | x |  |  |  |
| 421 | Temporary error, retry later | x |  |  |  |
| 422 | Command for a non-existing item received | x |  |  |  |
| 423 | Servers requires itemRef values for commands from device to server and device-sent commands without itemRef values |  |  | x |  |
| 500 | Generic temporary server error |  |  |  | x |

In one approach, the requests and their corresponding structures and responses that are used to inform the CLS about error situations are described below. The structures are also used to clear the errors when the error situations no longer exist.

The ErrorMessage structure is sent as a parameter to the raiseError and closeError requests. Not all members are set for all errors and all request methods. For each error and request method, the members are defined as unused, optional and mandatory. Note that the number in brackets after a member defines the maximum length of a member.

```
struct ErrorMessage
{
// Location of the problem
String databaseID[64];          // the id of a database for Rex or the
                                // SetEx database name for SetEx. Otherwise
                                // not set.
String dataItemID[128];         // the global ID of the Rex data item or
                                // the setting path for SetEx. Otherwise
                                // not set.
String taskID[64];              // the ID of the task in which the problem
                                // occured.
// User information
String whereDisplay[128];       // the display string in the client
                                // language to show the user where the
                                // problem occurred.
String whatDisplay[2048];       // the display string in the client
                                // language to show what went wrong.
String when;                    // When did the problem happen (UTC time)
// Component location - where is the component that
// detected the problem
String machineDisplayName[64];  // human readable name of the machine.
                                // If more than one deployment may run
                                // on this machine, be as specific as
                                // possible to identify this instance.
String componentName[64];       // the name of the software component that
                                // detected the problem. This is
```

-continued

```
                       // information for the developer. The
                       // component version may be included.
String exception[2048]; // the exception that causes the problem.
String context[2048];  // the reason why the error is detected or
                       // if possible the reason of the problem
                       // itself. Also any additional information
                       // to find the problem reason can be added
                       // here.
// Programmatic information to handle the bug in the error
// dispatching and view system
String messageID[64];  // a worldwide unique ID for every error
                       // message. This is the reference if you
                       // close a message or resend it and it
                       // may not show up twice.
String userAction[32]; // One of the NO_ACTION, VIEW_ACTION,
                       // TAKE_ACTION or IMMEDIATE_TAKE_ACTION.
int errorID;           // One of the predefined errors ids. The
                       // error category is part of the upper
                       // bits.
}
```

As response to all requests, the Error Response structure is returned to the calling device.

```
struct ErrorResponse {
  int status;      // the status of the executed request.
  String message;  // A general message field which is e.g.
                   // used to transport error messages for
                   // developers.
}
```

As response to each request, the CLS returns the outcome of the request by setting the status member in the response structure. The values for the status member are:

TABLE 3

| Name | Value | Description |
| --- | --- | --- |
| OK | 200 | CLS executed the request without a problem. |
| BAD_REQUEST | 400 | CLS was not able to understand the request at all. This may not happen and is a hint to a client bug. |
| INVALID_ARGUMENT | 402 | A mandatory member of the ErrorMessage structure is missing or one member of the ErrorMessage structure was set with an invalid value e.g. the string is too long. The message field will hold the name of the invalid field. |
| TEMPORARY_SERVER_ERROR | 500 | CLS has a temporary problem. The device may retry the request with an increasing delay. |

The raiseError call is used to inform the CLS that an error has occurred on the device. The ErrorResponse request takes an ErrorMessage structure as argument where different members are set according to the error type. As a result, an Error Response structure is returned.

ErrorResponse raiseError(ErrorMessage)

The closeError request clears the error that is reported by a previous raiseError request. Only the messageID member of the ErrorMessage structure is used for the closeError request. When the CLS receives the request, it clears a previous reported error with the same messageID.

ErrorResponse closeError(ErrorMessage)

Record Exchange Functions

This section describes the functions in the Record Exchange API. For the functions that modify parameters passed to them, the following convention is used:

→ a right-pointing arrow indicates that value is set by the client and not modified by the server ← a left-pointing arrow indicates that server does not read the value sent by the client but will return a value ↔ a bi-directional arrow indicates that server both reads the client's value and returns a possibly updated value The pre-exchange functions of the record exchange API include checkSyncAnchors, initRefresh, and queryChanges. Descriptions of the pre-exchange functions, their corresponding formats and parameters are provided below.

checkSyncAnchors: A client calls this function with both anchors for the data type inside the DataType structure to verify that one of the two sync anchors matches the server anchor. If a sync anchor check fails for a given data type, then the server will return a refresh-required result. The sync anchor values stored on the server will not be modified.

ExchangeResult checkSyncAnchors(DataType[ ] dataTypes)

Parameters:
 dataTypes—an array indicating which data types to use in the check:
  → dataTypeName
  → syncAnchor—the current device sync anchor for this data type.
  → pendingSyncAnchor—the pending anchor for this data type.
Returns: an ExchangeResult which contains a DataType array with the appropriate exchangeStatus specified for each DataType.

← result—200 (OK) when the server has successfully processed the request, or a defined error code.
← dataTypes holds the exchangeStatus for the data types—200 (OK), 201, or a defined error code.

initRefresh: If the client determines, or has been told by the server, that a refresh is required, then it calls initRefresh to begin the refresh process.

ExchangeResult initRefresh(DataType[ ] dataTypes)
Parameters:
dataTypes—an array indicating which dataTypes to use in the initialization:
→ dataTypeName,
→ exchangeStatus—250 (Exchange refresh),
→ syncAnchor—the new anchor for this data type.
Returns: an ExchangeResult populated as follows:
← result—200 (OK) when the server has successfully processed the request, or a defined error code.
← dataTypes indicates the init status for each data type specified in the original call: 200 (OK), 201, or a defined error code.

queryChanges: This function is used for cases where a client wants to poll the server for any pending changes, perhaps to provide user feedback, prior to performing an exchange.

ExchangeResult queryChanges(DataType[ ] dataTypes)
Parameters:
dataTypes—an array defining which dataTypes to use for the change query. Sending an empty data type array will query changes for all data types.
→ dataTypeName
Returns: an ExchangeResult populated as follows:
← result—either 200 (OK) when the server has successfully processed the request, or a defined error code.
← dataTypes indicates which DataTypes have pending changes on the server. If the caller passes an empty dataTypes parameter, then the data type's array result will contain only the data types for which changes exist on the server. If the caller passes a non-empty dataTypes parameter, then the same array will be returned with 200 (no changes), 201 (records pending), or 417 exchange status specified for each data type.

The post-exchange functions of the record exchange API include ackItems, putItems, and ackAndPutItems. Descriptions of the post-exchange functions, their corresponding formats and parameters are provided below.

ackItems: After receiving items from the server, a client returns an acknowledgement to the server. This informs the server of the arrival status of each record, thereby allowing the server to efficiently manage its cache of the client's data. In one implementation, this function uses an array of ExchangeItems, which is what the server returns to the client in the various getItems calls. The client only needs to specify the itemRef and result members of each ExchangeItem. Another way to use this function is to send an ExchangeItem with itemType set to Ack All, dataType set according to the group of items being acknowledged, and itemRef set to the last item successfully processed for that data Type. The server interprets this as a successful acknowledgement for all items of that dataType whose itemRef is less than or equal to the specified itemRef value. Note that it is possible to send multiple ExchangeItems this way. All individual ack items are included before ack-all-items in the itemAcks parameter.

ExchangeResult ackItems(ExchangeItem[ ] itemAcks)
Parameters:
itemAcks—an array of ExchangeItems containing information about the items being acknowledged. The requirements for the itemAcks are as follows:

TABLE 4

| ExchangeItem member | Requirements for Ack | Requirements for Ack All |
|---|---|---|
| itemRef | Yes | Yes |
| itemType | Yes | Yes |
| result | Yes | Optional (200) |
| dataTypeName | Yes | Yes |
| all others | Maybe | Maybe |

Returns: an ExchangeResult populated as follows:
← result—either 200 (OK) when the server has successfully processed the request, or a defined error code.
← DataTypes—a dataType structure array; each element is holding the exchangeStatus: 200) or a defined error code.

putItems: This function allows the client to send a number of items to the server.

ExchangeResult putItems(DataType[ ] dataTypes, ExchangeItem[ ] items).
Parameters:
DataType—the device sends for all dataTypes which are used in the items array from this request a new sync anchor.
→ dataTypeName
→ syncAnchor—the new anchor for this data type.
items—an array of ExchangeItems containing the records to be sent to the server.
Returns: an ExchangeResult populated as follows:
← result—200 (OK) when the server has successfully processed the request, or a defined error code.
← dataTypes—a DataType structure array for the data types in the request; each element is holding the exchangeStatus: 200, 201, or a defined error code.

ackAndPutItems: This function is similar to the putItems with the addition of a parameter that allows the client to acknowledge received items before putting new ones.

ExchangeResult ackAndPutItems(ExchangeItem[ ] acks, DataType[ ] dataTypes, ExchangeItem[ ] items)
Parameters—similar to putItems, with the addition of the following:
acks—contains acknowledgement information for specific ExchangeItems. The server will process these acks before accepting records from the client. See the ackItems function description for more information.
Returns: same as putItems.

getItems: The client calls this function to retrieve pending records for one or more data types. This is a common method of retrieving records from the server. The itemRef value for each data type allows the server to determine which records in the item cache the client has already received and which ones still need to be sent. The client may send in this field the last processed itemRef.

ExchangeResult getItems(DataType[ ] dataTypes, int limit)
Parameters:
dataTypes—an array of DataType structures that inform the server which data types to sync and at which point in the item cache to begin sending records. The DataType items are passed as follows:
→ dataTypeName—the name of the data type.
→ syncAnchor—the new anchor for this data type.
The server will ignore requests for getItems when the DataType array contains no element.
limit—this is an optional parameter that specifies the maximum size of the uncompressed response XML-RPC message. If this value is omitted, then the server will use a limit value that it deems to be reasonable.

Returns: an ExchangeResult that is populated as follows:
← result—200 (OK) when the server has successfully processed the request, or a defined error code.
← dataTypes—contains DataType structures for each of the data types from the request that have items ready to be retrieved. It is populated as follows:
← dataTypeName
← exchangeStatus—either 200 (OK), 201, or a defined error code.
← items—contains the pending records, populated as follows:
← itemRef
← itemType
← recordID—is a temporary LUID for add items, a client LUID for all other item types.
← dataTypeName
← data—is omitted for delete items.

ackAndGetItems: This function is similar to getItems with the addition of a parameter that allows the client to acknowledge received items while getting new ones.

ExchangeResult ackAndGetItems(ExchangeItem[ ] acks, DataType[ ] dataTypes, int limit)

Parameters:
acks—contains acknowledgement information for specific ExchangeItems. The server will process these acks before retrieving records from the item cache. See the ackItems function description for more information.

Figure 16:
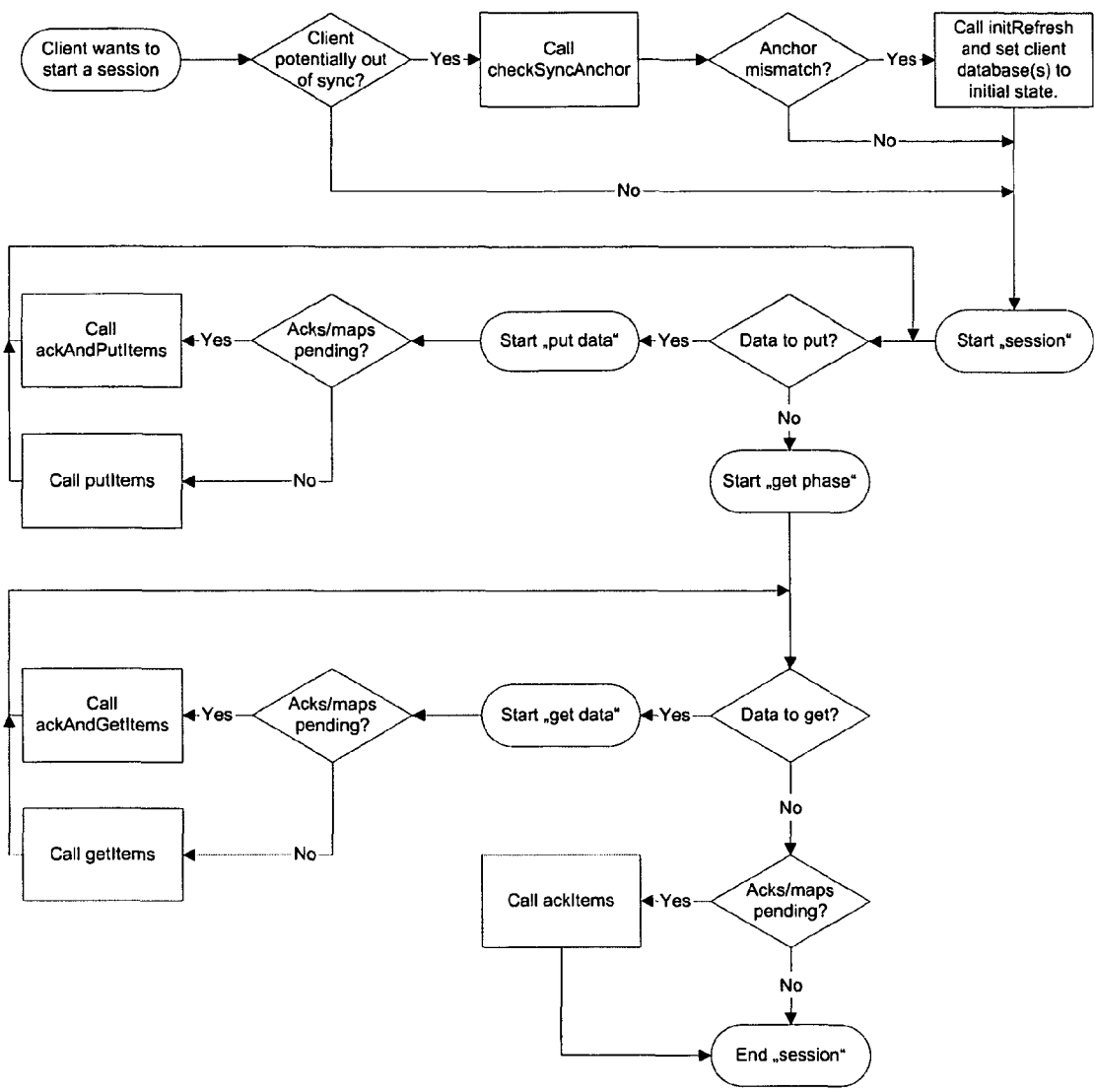
FIG. 16 illustrates a flow diagram of interactions between a user device and a server using the different REx methods.

FIG. 16 illustrates a flow diagram of interactions between a user device and a server using the different REx methods.

Record Exchange Item Types

As a response to the getItems or ackAndGetItems request, the server may return a Clear command. This command has no data content and forces the device to remove all items for the given data type name.

In some situations, such as importing client device PIM data as part of the initial sync or fetching shadow data from a dataSource, the server can return a Query command to the device to force the device to upload the data for the given data type to the server.

Figure 17:
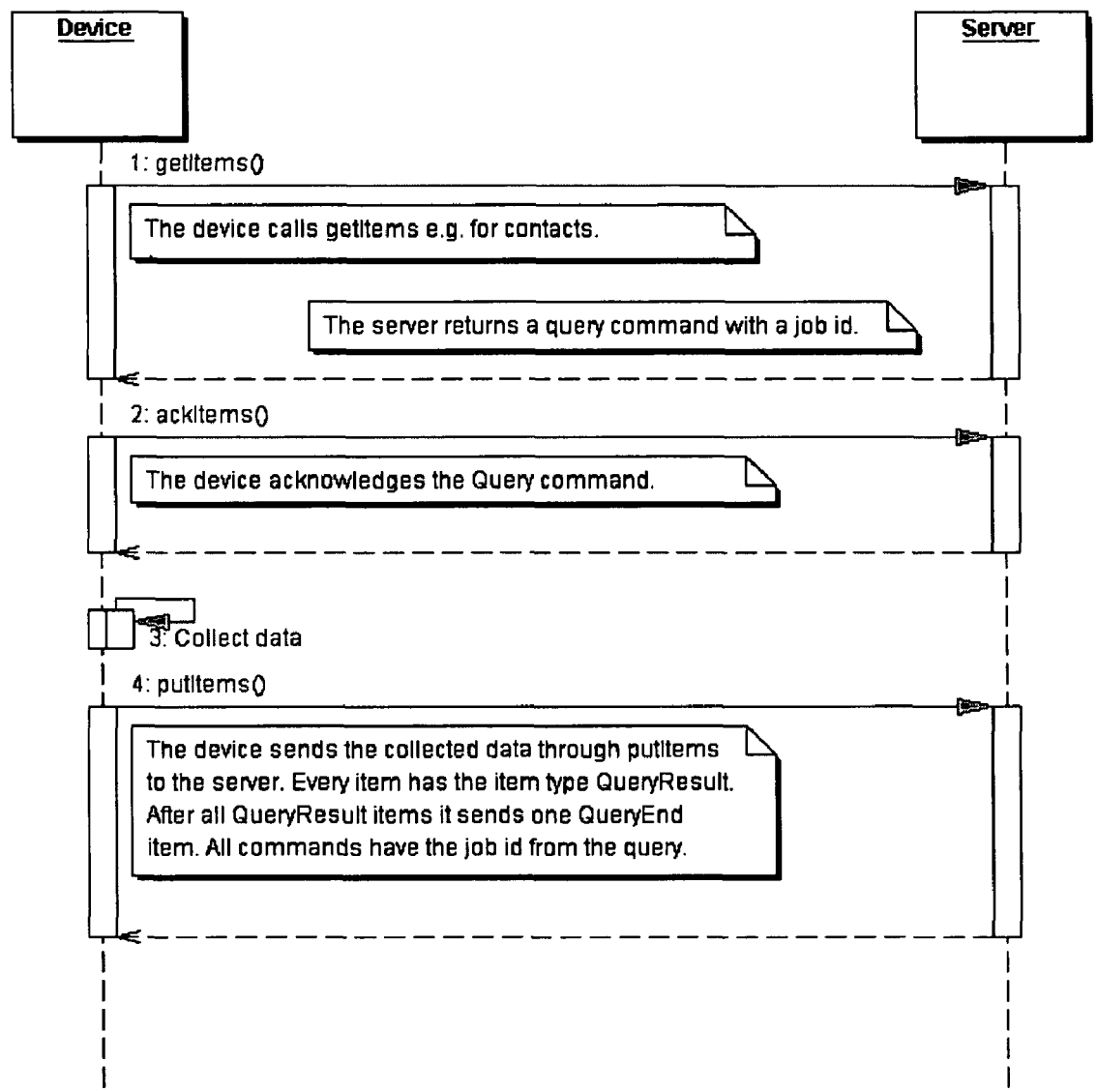
FIG. 17 illustrates a sequence diagram for a query process according to an embodiment of the present invention.

FIG. 17 illustrates a sequence diagram for a query process according to an embodiment of the present invention. In step 1, the device calls the getItems method to request information from the server. In response to a getItems or ackAndGetItems request, the server returns a Query command. In the ExchangeItem of the command, thejobID field is set and marks this query. An optional data field may contain a filter to restrict the query. When no filter is given, the device will return all items for the given data type. An example of ExchangeItem for a Query command is shown below:

```
struct ExchangeItem {
    itemRef = 222
    itemType = 9           // Query
    dataTypeName = contacts
    jobID     = e2f28cee570111d89d7fac1000270000
}
```

In step 2, the device calls ackItems to acknowledge that it has received the Query command. In step 3, the device collects the queried data. In step 4, the device sends the data to the server using putItems. Each queried item is sent as one QueryResult. After all QueryResult items are sent, one QueryEnd item is sent which marks that the data upload for the query is done. All QueryResult and QueryEnd items have the jobID field set to the job ID from the query to indicate that these items are related to the query with this jobID. An example of QueryResult and the final QueryEnd ExchangeItem is shown below:

```
struct ExchangeItem {
    itemType = 10           // QueryResult
    dataTypeName = contacts
    jobID     = e2f28cee570111d89d7fac1000270000
    data = <contact class="PUBLIC">...</contact>
    recorded = BB0gAA==     // LUID
}
struct ExchangeItem {
    itemType = 11           // QueryEnd
    dataTypeName = contacts
    jobID     = e2f28cee570111d89d7fac1000270000
}
```

When the result for the query is too large for one putItems call, the device may use multiple putItems to upload the items to the server. The final QueryEnd command is sent only in the last putItems call.

When the device restarts after step 2, for example after a device crash, after a user turned off the device, or after replacement of a dead battery, it continues with the query. Since the device has already acknowledged the Query command, the server will not resend this command. Therefore the device makes this command persistent to survive the restart. To avoid this situation, the device may acknowledge the Query command by calling ackAndPutItems in step 4.

Note that the server may set a filter as part of the Query command using the data field. In one implementation, the server only uses the string {partial} as filter for dataSources. This filter informs the dataSource to return only shadow information for the queried items. This will reduce the amount of uploaded data. When the server needs the complete item, it will send a Get command to fetch it.

When the server requests for the shadow information (through the partial filter), the dataSource returns this information for the different type of data, such as mail, contact, task, and event items.

A Get command requests the device, by specifying a LUID, to upload the specified item to the server using putItems. Below is an example of ExchangeItem for a Get command:

```
struct ExchangeItem {
    itemRef = 392
    itemType = 6           // Get
    dataTypeName = AAAAANWXbwt76SlDtJeWirnVnshCgQAA
    recordID = RDIgAA==     // LUID
    jobID     = 3a2f1bee57c111d8ae44ac1000270000
}
```

The device sends the item back using a GetResult. A job ID is used to connect the Get and the GetResult:

```
struct ExchangeItem {
    itemType = 15           // Get Result
    dataTypeName = AAAAANWXbwt76SlDtJeWirnVnshCgQAA
    recordID = RDIgAA==     // LUID
    jobID     = 3a2f1bee57c111d8ae44ac1000270000
    data = ...
}
```

Note that like the query case the device uses ackAndPutItems to acknowledge the Get command and to send the requested item in one call to the server, or the device makes the result of the Get command persistent. When the device receives a Get for a non-existing item, it acknowledges the item with the 422 status code.

A QueryResult command is used by the device in the result of a query and as a response to a Get command. When a dataSource detects a new item, it sends an Add command to the server. When the dataSource detects a huge amount of new items (e.g. a new email folder with thousands of emails copied into the dataSource), it sends a QueryResult command for each new item containing only the shadow information. Upon sending the last piece of information of the QueryResult command, a QueryEnd command is sent to inform the server that the upload has finished. The server will send Get commands when it needs the complete information of one item. This reduces the amount of data send for such cases.

Synchronizing Server and Devices

The connected-life server (CLS) optimizes the synchronization of data between the server and the one or more user devices. Specifically, the CLS creates a backup of the connected-data-set at the server according to a predetermined backup interval. It then generates a checkpoint marker for tracking the time intervals when the backup of the connected-data-set is created and sends the checkpoint marker to the one or more user devices for maintaining a first record of changes to the connected-data-set.

To determine whether the server and the one or more user devices are out of synchronization, the CLS detects a replacement of the server or a crash of the server. Alternatively, the CLS may execute a session-based syncML protocol or a sync anchor protocol (described below) to determine whether the server and the user devices are out of synchronization. Upon determining the server and the one or more user devices are out of synchronization, the CLS restores the backup data of the connected-data-set at the server. Next, it requests the first record of changes of the connected-data-set from the one or more user devices using the checkpoint marker. It determines first portions of the connected-data-set that have changes after the checkpoint marker according to the first record of changes of the connected-data-set from the one or more user devices. This is done by comparing portions of the connected-data-set that have newer timestamps after the checkpoint marker between the one or more user devices and the server. It then updates the first portions of the connected-data-set that have changes by executing transactions of the first record of changes at the server.

Similarly, upon determining the server and a backend database are out of synchronization, the CLS restores the backup data of the connected-data-set at the server. Next, it requests the second record of changes of the connected-data-set from the backend database using the checkpoint marker. It determines second portions of the connected-data-set that have changes after the checkpoint marker according to the second record of changes of the connected-data-set from the backend database. This is done by comparing portions of the connected-data-set that have newer timestamps after the checkpoint marker between the backend database and the server. It then updates the second portions of the connected-data-set that have changes by executing transactions of the second record of changes at the server.

The primary purpose of the sync anchor protocol is to detect that the device and the server ran out of synchronization for exchange items. The client device has the responsibility to synchronize with the server. However, there is at least one scenario that cannot be detected by the client alone. Considering the following sequence of events:

Client and server are in Sync at point A.

Client and server later are in sync at point B, and the actual dataset is different than at point A.

The user does a system restore of the whole device image, including all data, configuration files, etc.

The client may be started, but when it checks its local data, it sees a consistency because it is at point B. However, it is inconsistent (not in-sync) with the server, which assumes the device being at point B.

This issue is addressed by the REx sync anchor protocol. Based on the sync anchors, the server can verify and inform the client that it is not in-sync anymore. This is done for each database to minimize the traffic for transferring data that need to be refreshed. For each type of exchange item, the device maintains two anchors. One is the current anchor for the type of exchange item. When the device requests or sends data from or to the server, it generates a new anchor and sends this data in the request. When the request ends without an error, the device knows that the server has received the new anchor successfully. In this case the device stores the new anchor as the current anchor.

When a client initiates a communication with the server, it calls the checkSyncAnchors method to check whether the device and server anchor match. If not, the device and server run out of sync for this type of exchange item.

Figure 18:
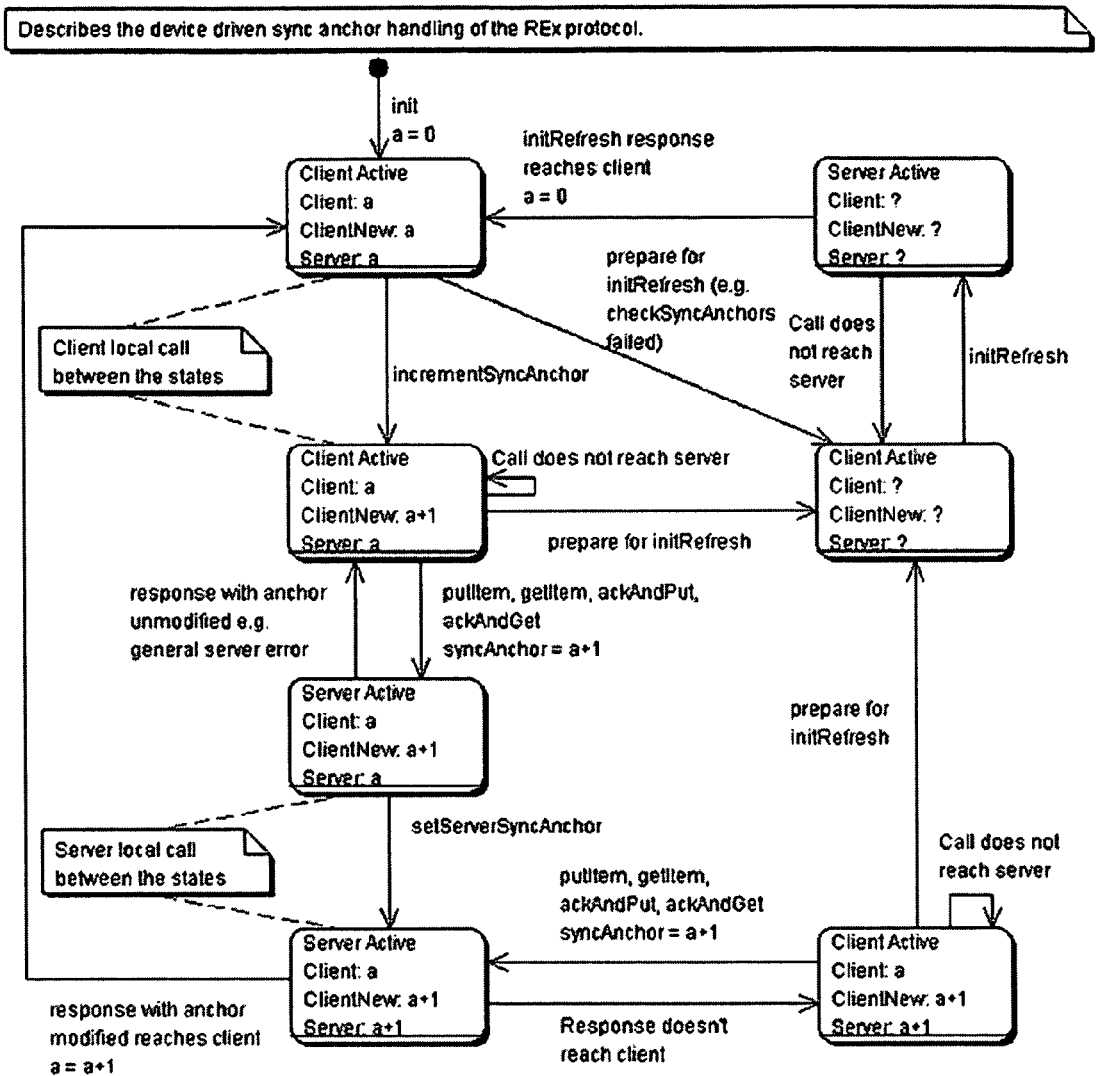
FIG. 18 illustrates a sync anchor protocol for synchronizing between a client device and a server according to an embodiment of the present invention.

FIG. 18 illustrates a sync anchor protocol for synchronizing between a client device and a server according to an embodiment of the present invention. As shown in FIG. 18, the device maintains two sync anchors for each data type name. One is the current anchor, and when the device calls a method which sends or requests data, the device generates and sends a new sync anchor (the pending anchor) for each data type of the request to the server. A successful overall response implies that the server got and stored the new anchors for these data type names (even when the exchange status for a specify data type is not successful). In this case the device stores the new anchor for each data type as the current anchor. If the device gets no response or a response with an unsuccessful overall result code, it stores the pending anchor and resends it as the next new anchor.

The device calls checkSyncAnchors with the current anchor and optionally with the pending anchor if the pending anchor exists. When one anchor matches the server anchor, the device and the server are in sync. In this case and when there is a pending anchor, the device uses the previously sent current anchor as current anchor since it does not know whether the server has received the pending anchor, and sends the pending anchor as the next new anchor.

When the anchor check fails, the server returns an error status code 417. The device sets back the anchor to the initial anchor, and calls initRefresh with a new anchor (not the initial anchor). Then, it calls getItems to determine whether the server has a Clear or Query command for the device. Next, the device optionally sends device-managed items through putItems to the server. Finally, the device calls getItems to retrieve the updated items from the server.

When a device (or one part of a device which is responsible for one data type name) starts, it first calls checkSyncAnchors to check whether the device and the server are still in sync. Note that methods like getItems or ackAndPutItems can also return a 417 exchange code for data types from the request. In this case the device acts as if a call for checkSyncAnchors has failed.

When the device starts the initial sync for a data type after installation or after an unknown data type 404 situation, it calls checkSyncAnchors with 0 as initial sync anchor. It is optional whether the device also sends the 0 as pending anchor. It is required that server and device are in sync for the initial sync.

The device calls getItems after the initial checkSyncAnchors call, and as result of the getItems call, a Clear or Query command is returned. The device activates the change detection when this initial command is processed.

Notifying User Devices Status of Communications

The CLS notifies a user status of communications between the server and the user. The user has one or more user devices that share portions of a connected-data-set maintained by the CLS. In one implementation, the CLS monitors communications between the server and the one or more user devices for a predetermined set of notification conditions. The set of predetermined notification conditions are formed according to information provided by the manufacturers and according to information gathered through actual usage of the one or more user devices. In addition, the set of predetermined notification conditions includes transmission failures of elements of the connected-data-set.

For example, the notification message may include a title of the communication that a notification condition is detected. The notification message may also include an abstract of the communication that a notification condition is detected. Furthermore, the notification message sent by the server to the device may include a hyperlink. This hyperlink may point to a web page that elaborates more on the nature of the notification, or it may even lead the user to a web page where he can solve the issue (for example, entering a new password to access a backend). This method is beneficial because normally only few items of information may be transported to the client device, and because it often requires many words to explain the nature of a notification. Also, the hyperlink provides a means for extensibility. In the notification message (or the menu of a notification screen or application), there may be an option to start a browser to load the web page behind this hyperlink.

When a notification condition is detected, the CLS sends a notification message to the one or more user devices. Note that in one implementation, the notification message may be sent to user devices that the predetermined set of notification conditions is detected. In another implementation, the notification message may be sent to user devices that the predetermined set of notification conditions is not detected.

In yet another implementation, the set of predetermined notification conditions may include email, task, calendar, and address book overflow conditions for the one or more user devices. In order to avoid device overflow, the server monitors and records the amount of data each device application may hold. The data is gathered either through information provided by the device manufacturers, for example, a user's manual may specify the address book of a device can hold a maximum of 500 contacts; or through testing of the user device, for example, the device refuses to store more than certain number of records sent by the server; or through actual usage, for example, certain calendar application still may work even if the number of events exceeds the predefined maximum number in the user's manual.

Based on the data gathered, the server can define a set of upper limits per device type or application in the server infrastructure. Since the server monitors the actual number of records on each device, it can stop sending more records to a device when the number of records on the device is approaching the predefined upper limit. For example, the server may keep the device 90% full to allow the user still do some useful work. In addition, the server may alert the user that a specific application (such as email or calendar) on the device has reached the predefined upper limit and request the user to take proactive actions, such as applying a different filter for the specific application to reduce the number of records on the device. In other approaches, different rules may be applied to different data types to manage the amount of records on a device. For instance,

- Mail: higher priority is assigned to the new mails, which will always be sent to the device. If the device needs to make room for the new mails, the old mails will be deleted in the order from the oldest to the newest.
- Task: higher priority is assigned to the open tasks, the nearer the due date, the more important is the task. If the device needs to make room for the new tasks, the completed tasks will be deleted in the order from the oldest to the newest.
- Calendar: higher priority is assigned to events that will occur in the near future. In general, events in the future are more important than events in the past. If the device needs to make room for the new events, the past events will be deleted in the order from the oldest to the newest.
- Address book: higher priority is given to the ones that are already on the device. If the address book is full, the server will not deliver new addresses from other devices or from the backend to the device.

Settings Exchange (SetEx) Protocol

The Settings Exchange (SetEx) protocol is used to exchange the settings information between the device and the server. SetEx is supported by DPREx protocol with changes to the data structures. Similar to the DPREx protocol, the data content is an XML document holding the settings changes. The encoding of the XML data content document is always the same as the encoding of the XML-RPC envelope. The encoding is able to represent all Unicode characters. The SetEx protocol uses settings as base URL extension; for example, http://server:port/dp/settings is an example of a SetEx URL.

Settings Exchange Status Codes

SetEx uses the same status codes as DPREx. The status code 300 is returned when a device is in a zombie state and tries to put or get settings to or from the server. In this case the device first sends the device type identification. SetEx uses a new status code 405. This code is returned as a response to a SetEx call in order to determine when the server requests to get settings from the device.

Settings Exchange Process Flow

In one embodiment, the process flow for settings exchange is described in three use cases: 1) initial settings exchange; 2) normal settings exchange; and 3) dump settings exchange.

During the initial settings exchange, the device identifies its device type to the server. This situation occurs when the device is connecting to the server for the first time. Note that this can happen when the user has bought a new device or when the device has been completely reset, or if the device state is reset to zombie on the server side. In all these situations the device starts by exchanging the device type identification settings. This enables the server to determine the true identity (correct device type identification information) of the device. There are two possible process flow scenarios. In the first case, the device thinks it is connecting to the server for the first time, and it exchanges the device type identification settings. In the second case, the device thinks it has been initialized (synced device type identification settings) while the server thinks otherwise. Both these cases are discussed in association with the sequence diagrams described in the following sections.

Figure 19:
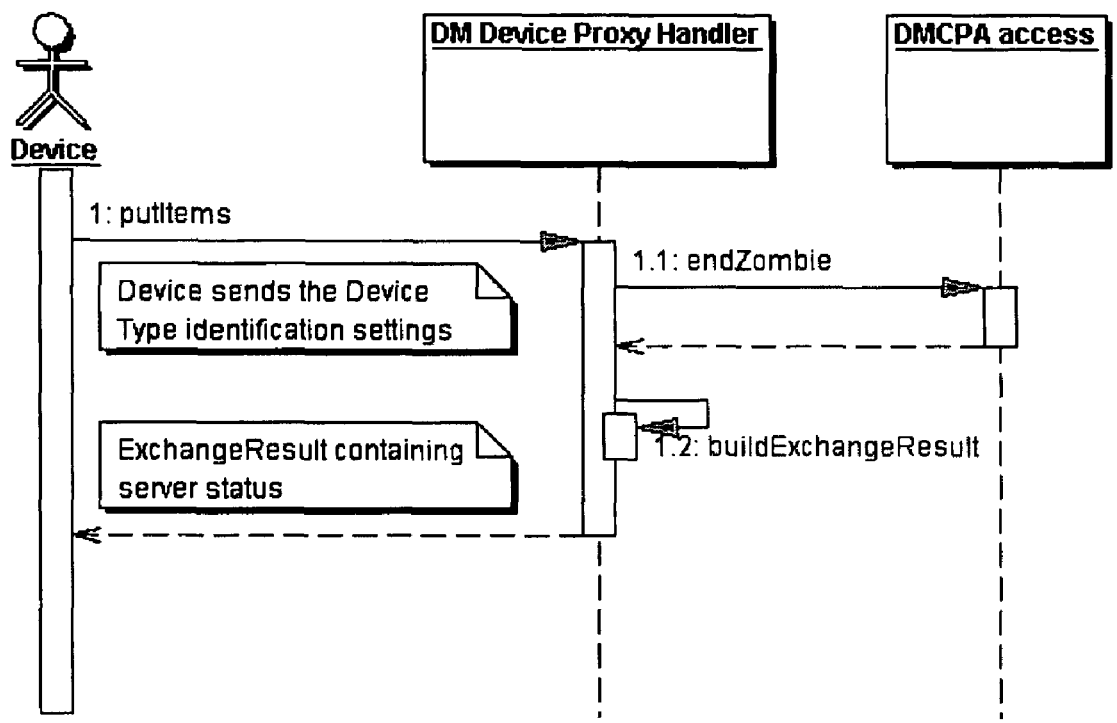
FIG. 19 illustrates a process flow diagram when the device exchanges device type identification settings according to an embodiment of the present invention.

FIG. 19 illustrates a process flow diagram when the device exchanges device type identification settings according to an embodiment of the present invention. As shown in FIG. 19, in step 1, the device calls putItems to exchange device type identification settings. In step 1.1, the server ends the device zombie state after properly identifying the device. In step 1.2, the server builds a response by calling the buildExchangeResult method. The response contains server status to be sent to the device. If the device is already out of the zombie state when it receives the device type identification settings, this operation will have no effect.

Figure 20:
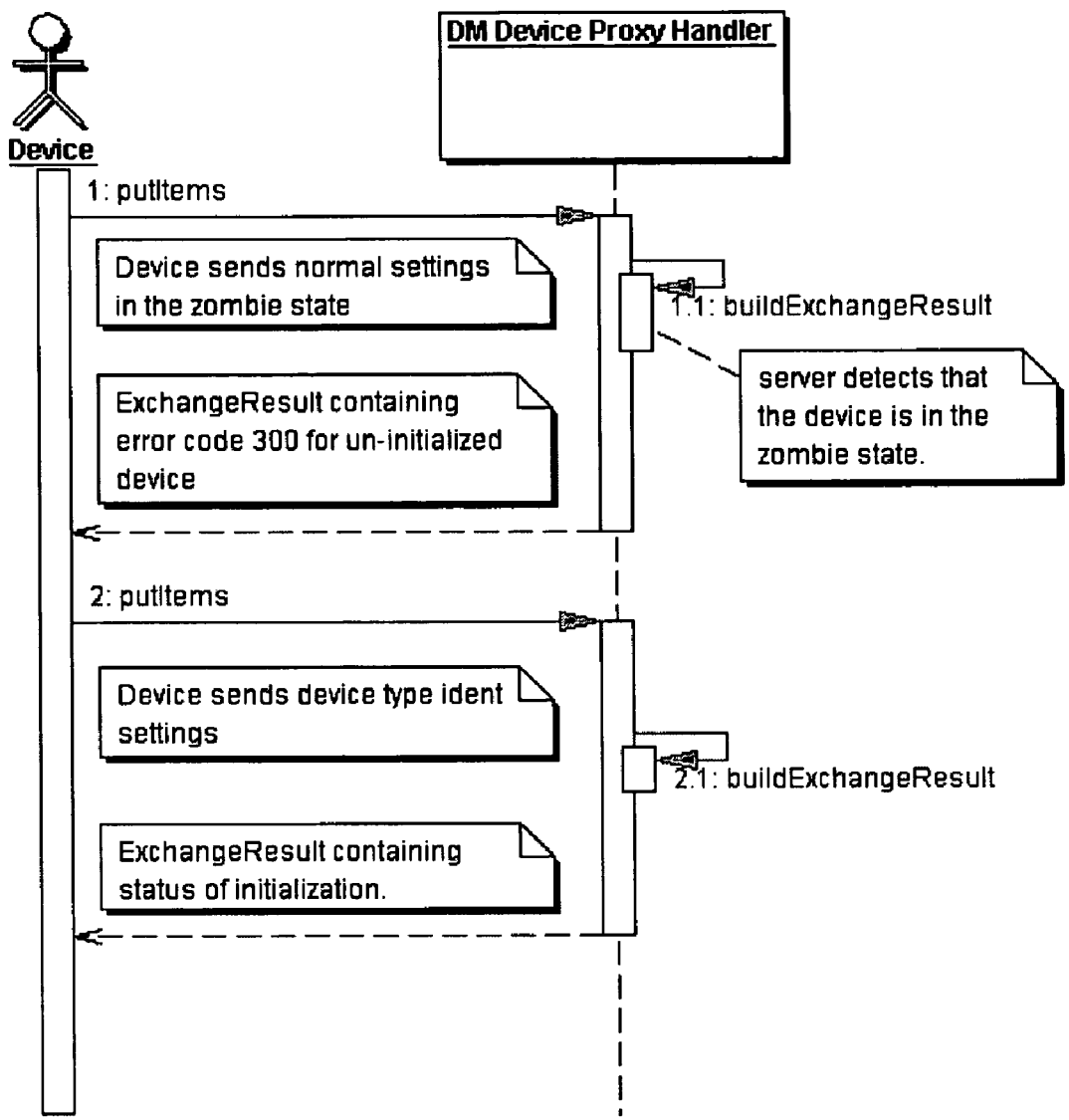
FIG. 20 illustrates a process flow diagram when the device tries to exchange settings other than device type identification in the zombie state according to an embodiment of the present invention.

FIG. 20 illustrates a process flow diagram when the device tries to exchange settings other than device type identification in the zombie state according to an embodiment of the present invention. This situation occurs when the known state of the device on the server is in zombie state and the device is attempting to exchange normal application settings. As shown in FIG. 20, in step 1, the device calls putItems to exchange normal settings. In this case the server rejects the device request with an error code 300, which indicates that the device is in the zombie state. In step 2, the device then calls putItems to exchange the device type identification settings that enable the server to confirm the identity of the device and end the zombie state.

In the case of normal settings exchange, the device exchanges settings for applications running on the device. In this scenario, the device is no longer in the zombie state and can perform normal settings exchange between the device and the server.

Figure 21:
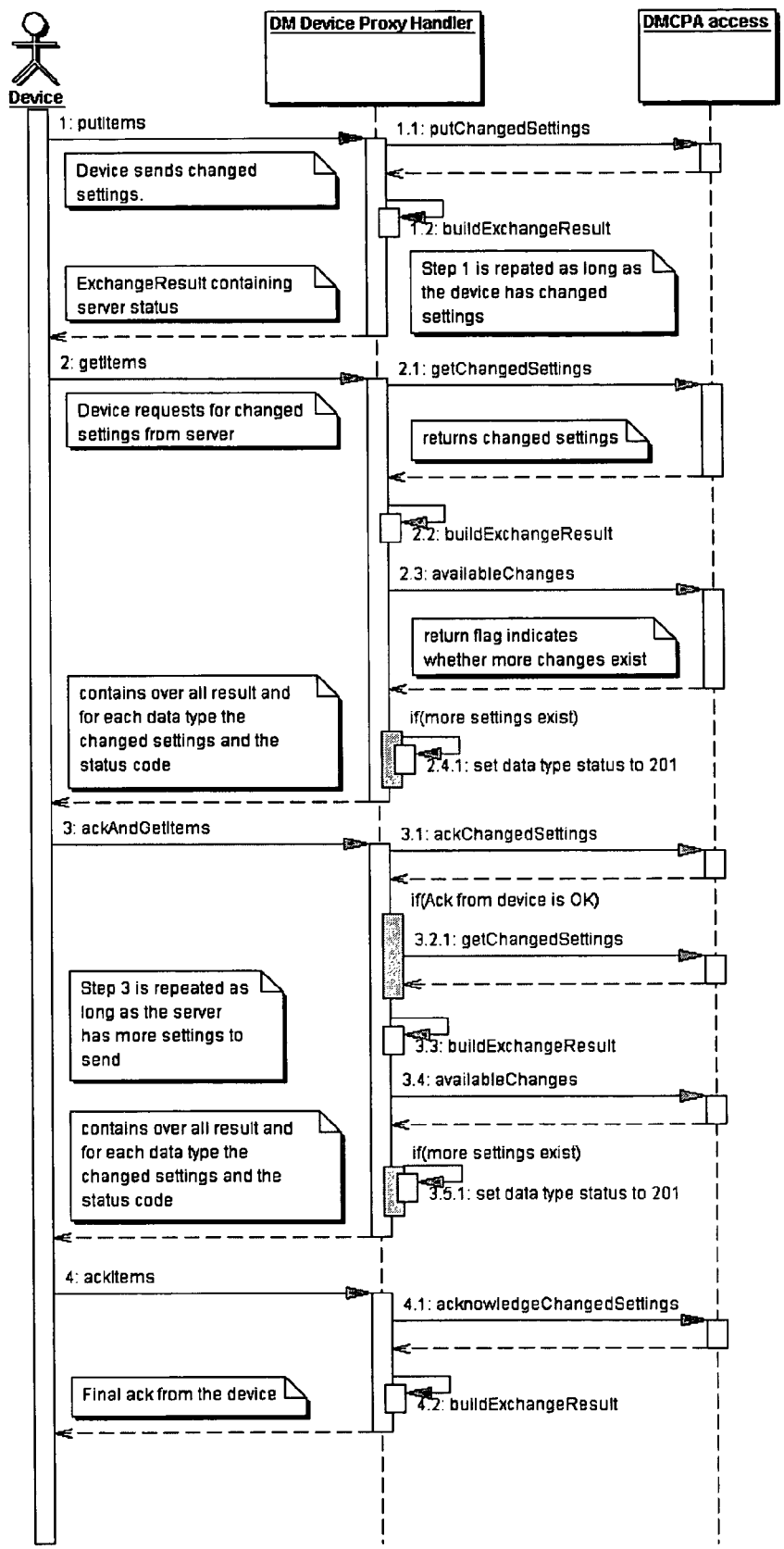
FIG. 21 illustrates a sequence diagram for normal settings exchange according to an embodiment of the present invention.

FIG. 21 illustrates a sequence diagram for normal settings exchange according to an embodiment of the present invention. As shown in FIG. 21, in step 1, if the device has changed settings, it sends them to the server using the putItems method call. It repeats this step as long as it has more settings to send.

If the device receives a notification from the server for pending settings changes available on the server, it issues a getItems call to retrieve the settings changes. Note that this step may be omitted if there are no pending settings available on the server for the device.

The device issues an ackAndGetItems method call if the server has flagged through the 201 data type status code that more settings changes exist. The device in this case acknowledges the settings received in the last response from the server and requests for the pending settings changes on the server.

Finally after all the settings changes have been fetched by the device from the server, it issues an ackItems call. The ackItems method enables the server to clean up any resources that are associated with the changed settings sent from the server.

In the process flow described above, there is no difference between updating settings. The major difference is the data content, although the operations are different. Note that:
1. Delete with an empty settings document, deletes the whole database.
2. All settings and the sub-trees of those settings that are leaves in the delete data content document are deleted.
3. A setting marked as a node in the delete data content does not delete the sub-tree.

For example, the existing tree is:
a/b/m
a/b/n
a/c/

To delete m and n, one may specify the sub-node. The SetEx data content for deleting m and n is:

```
<Node name="a">
    <Leaf name="b"></Leaf>
</Node>
```

Note that the sub-node b is specified as a leaf in the deleted data content. The resulting tree is:
a/c It is uncommon to delete leaves. Also note that the interior nodes do not have semantic. From the above schema example the tree (a/c) is the same as (a/b, a/c), because b is an interior node and has no semantic. So deleting the leaf a/b/m and a/b/n is semantically the same as deleting a/b in the above example.
Leaf node delete example:

```
<Node name="a">
    <Node name="b">
        <Leaf name="m"></Leaf>
        <Leaf name="n"></Leaf>
    </Node>
</Node>
```

The resulting tree is:
a/c

To simplify implementations, data content specs may define that deletes are allowed on specific sub-nodes. A data content restriction for the above example may be that only deletes on a/b are allowed, but not on a leaf.

Dump Settings Exchange

In the dump settings exchange case, the device issues a SetEx method call. The server determines that it likes to get all settings from the device. This method is primarily used for testing or checking that the device is in the state the server expects by getting all data from the device. When this happens, the server responds with a special error code 405. In response to the error code, the device starts dumping the settings information pertaining to the data type that caused this.

Figure 22:
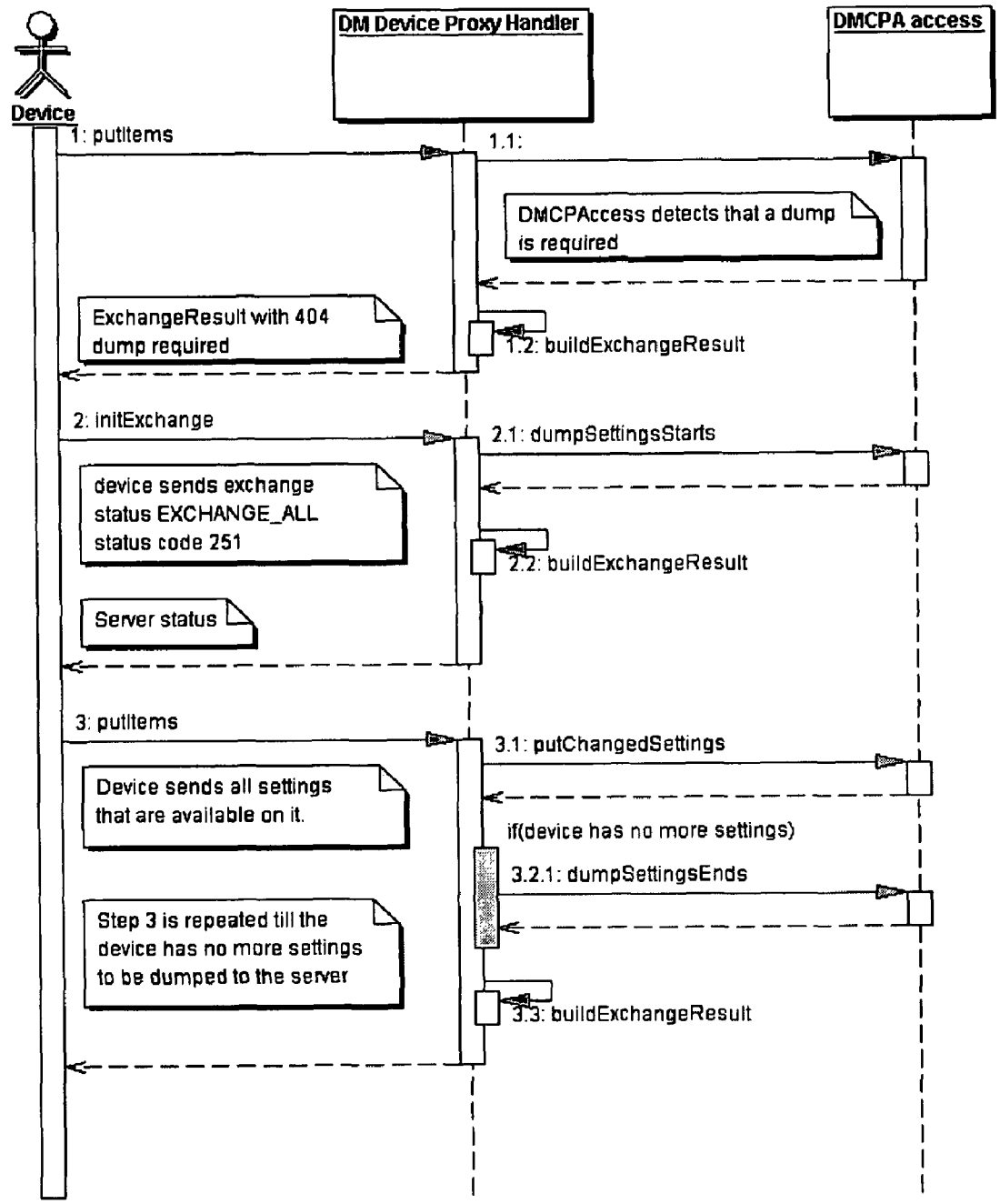
FIG. 22 illustrates a sequence diagram for dump settings according to an embodiment of the present invention.

FIG. 22 illustrates a sequence diagram for dump settings according to an embodiment of the present invention. The device invokes the putItems call to exchange normal settings. If the server is in a state that requires the device to dump all known settings for certain data types, it returns a 405 code for the given data type. Note that this may also happen when the device initiates a getItems call.

The device calls initRefresh (code 251) to notify the server that it has started a dump settings exchange. The device issues a putItems request in response to the dump required alert to be sent by the server. In this state, the device dumps all the settings it contains to the server. This step is repeated as long as the device has more settings that need to be dumped.

Settings Exchange Data Structures

This section describes enhancements to the core device proxy records exchange (DPREx) data structures. The ExchangeItem structure may be modified to support settings exchange. In particular, there are restrictions on what values are allowed in SetEx protocol for the itemType and recordID fields in ExchangeItem.

In one implementation, the itemType data structure supports Delete and Replace operations. In case of settings exchange, Replace is redefined to mean Add if the setting does not exist and update otherwise. The recordID field is omitted for settings exchange.

When a device requests for settings, but limits the message size to be less than a predefined size, the SetEx content is split to sizes less than the predefined size. Splitting is based on leaf nodes. For example, if the message size is set to 0, only one leaf node per request is transferred. It is often the case that the implementation is too complicated with this definition without any benefit. To simplify the implementation, it is possible to group settings on node level. An example of data content is shown as a/b/c, a/b/d, a/b/e, and a/m/c.

If grouping is enabled for a/b/, it is guaranteed that a/b/c, a/b/d, and a/b/e be transferred in one message, regardless of the message size. Note that this message can also contain other settings. It is up to the data content specification to define the settings.

The following sections show XML-RPC fragments that contain sample settings data content. In one implementation, the settings tree data content in the Data field of ExchangeItem are used for exchanging device type identification settings. There are six different device type identification settings used, and they are Mod, Hint1, Hint2, Hint3, Hint4, and Hint5. Here, Mod represents the device model and in most cases can be used to uniquely identify the device. Hint1 to Hint5 contain information to identify the device type, in addition to the information contained in the Mod string.

The following devTypeIdent XML schema defines which data is allowed. Note that the data type name for this case is s-devTypeIdent.

```
<?xml version="1.0" encoding="UTF-8"?>
<methodCall>
    <methodName>putItems</methodName>
    <params>
        <param>
            <value>
                <array>
                    <data>
                        <value>
                            <struct>
                                <member>
                                    <name>itemType</name>
                                    <value>
                                        <i4>2</i4>
                                    </value>
                                </member>
                                <member>
                                    <name>dataTypeName</name>
                                    <value>s-devTypeIdent</value>
                                </member>
                                <member>
                                    <name>data</name>
                                    <value><![CDATA[<Settings>
    <Leaf name="mod" format="chr">WinXP</Leaf>
</Settings>
]]></value>
                                </member>
                            </struct>
                        </value>
                    </data>
                </array>
            </value>
        </param>
        <param>
            <value>
                <boolean>0</boolean>
            </value>
        </param>
    </params>
</methodCall>
```

The following shows example of a server response for a getItems call the settings tree data content for exchanging email folder settings.

```
<member>
    <name>data</name>
    <value><![CDATA[<Settings>
    <Node name="Accounts">
        <Node name="1">
            <Leaf name="AccountID" format="chr">aAccountId</Leaf>
            <Leaf name="GUIName" format="chr">Markus Meyer</Leaf>
            <Leaf name="EMailAddress" format="chr">Markus
@web.de</Leaf>
            <Leaf name="IsDefault" format="bool">true</Leaf>
        </Node>
    </Node>
    <Node name="Folders">
        <Node name="1">
            <Leaf name="FolderID" format="chr">aFolderId</Leaf>
            <Leaf name="AccountID" format="chr">aAccountId</Leaf>
            <Leaf name="FolderType" format="int">0</Leaf>
            <Leaf name="GUIName" format="chr">web.de Inbox</Leaf>
            <Leaf name="SortType" format="int">0</Leaf>
        </Node>
        <Node name="2">
            <Leaf name="FolderID" format="chr">aFolderId2</Leaf>
            <Leaf name="AccountID" format="chr">aAccountId</Leaf>
            <Leaf name="FolderType" format="int">2</Leaf>
            <Leaf name="GUIName" format="chr">todo</Leaf>
            <Leaf name="SortType" format="int">0</Leaf>
        </Node>
    </Node>
</Settings>
]]>
    </value>
</member>
```

In SetEx, the Clear command is not used as the very first command for cleaning up traces of a previous installation or database activation. Therefore, when the device performs the first sync for a SetEx data type (a checkSyncAnchors call with anchor 0), it initiates a cleanup process by itself. The same initial-sync rules apply when the server forces the device to perform an initRefresh call by returning the exchange status 417 to a SetEx request.

Settings Exchange Functions

This section contains the list of changed definitions of the DPREx functions, including getItems, putItems, ackItems, and initRefresh. For getItems and putItems, the following restrictions apply: the recordID field is not used, and only Replace and Delete are supported for the itemType field in the returned ExchangeItem instances. The Data field of the ExchangeItem contains the settings data content.

For ackItems, the following restrictions apply: the recordID field is not used, and only Ack and AckAll are supported for the itemType field in the returned ExchangeItem instances. The Data field is not used in this case.

The initRefresh method may be called by the device in two cases. First, it is used to notify the server that the device is going to start a dump of all settings known to the device in response to a server alert. This is performed by sending in a special exchange status ExchangeAll represented by status code 251 for each data type known to the device. Second, the device wants to retrieve all known settings on the server after a getItems call. The device does this by sending the status INIT_REFRESH represented by status code 251 for each data type.

Application Exchange Protocol

Application Exchange protocol is used to define the process of exchanging software changes between the device and the server. The application exchange functionality is quite different from record and settings exchange which necessitates defining a new protocol on top of XML_RPC. The protocol flow, data structures, and functions for Application Exchange (AppEx) software are described in the following sections. The AppEx protocol uses apps as base URL extension and uses the version number and external user ID as URL parameter. An example of AppEx URL is shown as http://www.verdisoft.com/dp/apps?extID=2347dhji34&version=1.0.1.

Application Exchange Process Flow

Figure 23:
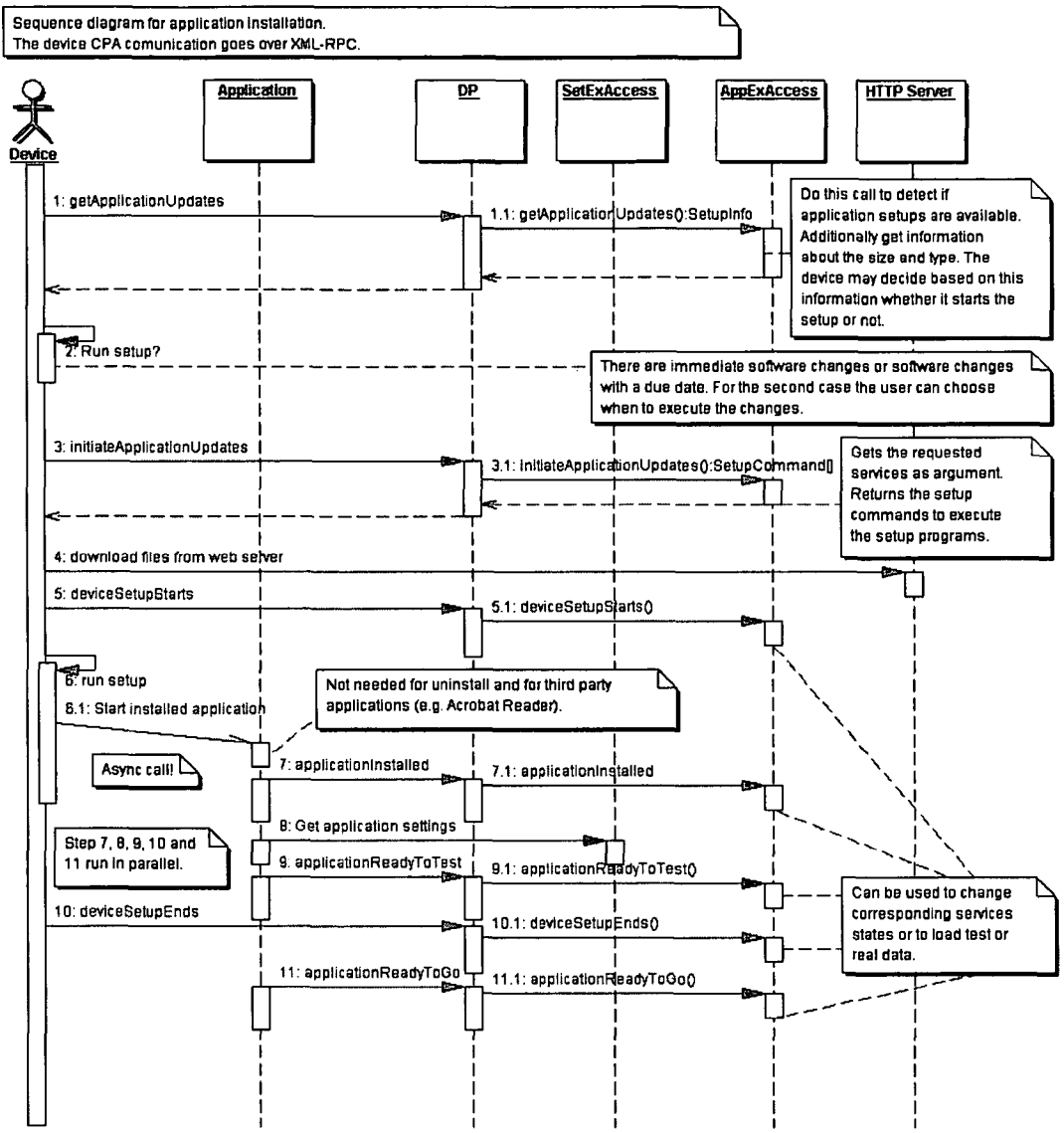
FIG. 23 illustrates a sequence diagram of an application exchange process flow between a device and a server according to an embodiment of the present invention.

FIG. 23 illustrates a sequence diagram of an application exchange process flow between a device and a server according to an embodiment of the present invention. The sequence of steps in software exchange process flow of FIG. 23 is described below:

1) The device requests the server for available application changes. The server returns a list of setup information for all applications that have changes available. When the server has no software changes, the AppEx process ends.
2) The device processes the setup information and decides when to start executing the software changes.
3) The device initiates the application setup. The server responds with a list of setup commands for the device to execute.
4) The device processes the setup commands and downloads the files required for the application setup. When a file download fails, the device stops downloading the remaining files. It installs the successfully downloaded software and then uses the sequence deviceSetupStarts and deviceSetupEnds with the appropriate error code to inform the server that the download has failed.
5) The device informs the server that the application setup processes will start on the device. This information is used by the server to invalidate all old services associated with the software that has been changed on the device. The server may respond with the special status code 301 to force the device to start the whole process from the beginning by calling getApplicationUpdates. When one setup command fails, the device stops executing the remaining commands.
6) The device starts the application.
7) The application informs the server that it is installed. The server uses this call to schedule settings for the device.
8) The device fetches settings necessary from the server.
9) The application informs the server through an optional request that it is ready for a self-test. The server activates some predefined test data for this application.
10) The device informs the server that the setup process on the device has completed for the specified applications. As part of the request the device sends a new software sync anchor.
11) The application informs the server through an optional request that it is ready to be used.

Application Exchange Data Structures

This section describes the XML_RPC data structures which are used in the exchange of software applications between the device and the server. The application exchange data structures include SetupInfo, SetupInfoItem, SetupCommand, Name ValuePair, and AppExResult.

The SetupInfo structure is used when the device requests the server for available software changes. The server returns a SetupInfo instance which represents software updates available for the device.

```
struct SetupInfo
{
    string          description;
    int             setupSize;
```

```
    Date            sunshineDate;
    SetupInfoItem[ ] setupInfoItems;
}
```

Data Members:
description: it is a mandatory field, and is human-readable. It describes the whole software update and is used by the device to display a message in the dialog box for the user if the user is asked to accept the update.
setupSize: it is a mandatory field, which specifies the space requirements for the application update.
sunshineDate: it is an optional field, which specifies the time when the software may be updated. The format is UTC. The access to the server can be denied when the device did not install the software in time. When this field is missing, the device processes the software changes immediately; otherwise the user will get asked if he wants to get the update now or later.
setupInfoItems: it is an optional field, which is an array of SetupInfoItem structures when software changes exist.

The SetupInfoItem structure is used inside the SetupInfo structure. Each SetupInfoItem represents a software change available for the device.

```
struct SetupInfoItem
{
    int             setupType;
    string          setupInfoId;
    string          description;
    boolean         additionalDescription;
}
```

Data Members:
setupType: it is a mandatory field, and it may contain one of the constants INSTALL=1, UPDATE=2, and UNINSTALL=3.
additionalDescription: it is an optional field, which specifies that the description for this setup item is independent of and additional to the overall description in the SetupInfo and is presented to the user additionally. If this flag is not present or is false, the description is not presented to the user.
setupInfoId: it is a mandatory field, which uniquely identifies the application setup change for the device.
description: it is an optional field, which describes the software change.

The SetupCommand structure is used to send setup commands to the device as part of the software change. An example of the SetupCommand structure and its corresponding data members are described below.

```
struct SetupCommand
{
    int             setupType;
    int             itemRef
    string          URL;
    string          CRCStr
    string          programId;
    NameValuePair[ ] nameValuePairs
}
```

Data Members:
setupType: it is a mandatory field, and it contains one of the constants INSTALL=1, UPDATE=2, and UNINSTALL=3.

itemRef: it is a mandatory field. The SetupCommand elements in the SetupCommand array are marked with an increasing item reference number. This item reference is used in some functions to identify one SetupCommand element from the array.

URL: it is an optional field, which specifies the URL for the setup command or file to download. This field is normally set by default. However, on some platforms, no software needs to be downloaded for an un-install.

CRCStr: it is an optional field and contains a CRC-32 check sum information. The CRC may be used by the device to cache software downloads based on the CRC, or it may be used to check whether the downloaded file is corrupted.

programId: it is a mandatory field, and contains an ID that uniquely identifies the application program being set up.

NameValuePairs: it is an optional field, and specifies the Name ValuePair data structure.

The NameValuePair structure is used as part of the Setup-Command structure. A Name ValuePair structure is used to specify name/value pair parameters. These parameters are specific to this installation and are used to transport information, for instance command line parameters, that is needed for the specific software and/or device type.

```
struct NameValuePair
{
        string name;
        string value;
}
```

The AppExResult structure is used to return the result of the method request. It contains information pertaining to application exchange.

```
struct AppExResult
{
    SetupInfo         setupInfo;
    SetupCommand[ ]   setupCommands;
    int               result;
}
```

Data Members:

setupInfo: it is an optional field, and is used for returning the application setup information to the device. This field is returned only when the device calls getApplicationUpdates.

setupCommands: it is an optional field, and is used for returning the setup commands associated with application change (install, update, or uninstall). This field is returned when the device calls initiateApplicationUpdates.

result: it is a mandatory field, and contains the result of the application exchange method request.

Application Exchange Functions

This section describes the functions used to perform application exchange between the device and the server. The AppEx functions include checkSyncAnchors, getApplicationUpdates, initiateApplicationUpdates, deviceSetupStarts, deviceSetupEnds, applicationInstalled, applicationReadyToTest, applicationReadyToGo, and initRefresh. Some functions can send an error code to the server. In one implementation, the error codes are defined below in Table 5.

TABLE 5

| Code | Name | Description |
| --- | --- | --- |
| 0 | OK | No error occurred. |
| 1 | ERR_CANT_GET_RESPONSE | The server did not respond to a call. |
| 2 | ERR_CANT_DOWNLOAD_FILE | The component was not able to download a file from the file server. |
| 3 | ERR_CANT_WRITE_FILE | The component is not able to store a downloaded file. |
| 4 | ERR_RAN_OUT_OF_DISKSPACE | Ran out of disk space (whatever disk for the current platform means). |
| 5 | ERR_RAN_OUT_OF_MEMORY | Ran out of memory. |
| 200 | ERR_SETUP_FAILED | The Setup program failed. |

Note that for device local errors like ERR_CANT_DOWNLOAD_FILE or ERR_RAN_OUT_OF_DISKSPACE, the device tries all possible steps to fix the errors (e.g. asks the user to check the Internet connection or to clean up the hard drive) before reporting the error to the server. When the device sends an error code to report a problem of the current software changes, the server disables the device.

The checkSyncAnchors is used every time a device starts up; it sends the current software anchor known to the device. When the device has a pending anchor, it also sends the pending anchor to the server. In the alternative when the device has no pending anchor, no pending anchor is sent to the server. The server compares the anchor received to the anchor stored on the server to determine whether the device and the server are out of sync.

AppExResult checkSyncAnchors(String anchor, String pendingAnchor)

Returns: an instance of the AppExResult where the result is 200 when the anchors match, and the result is 417 when there is an anchor mismatch.

The getApplicationUpdates method returns information about the list of all ion updates available for the device.

AppExResult getApplicationUpdates(String anchor)

Returns: an instance of the AppExResult that contains the SetupInfo structure when software changes are available. Otherwise the SetupInfo member is not set.

Parameters:

anchor—The device sends a new anchor.

The initiateApplicationUpdates method is invoked by the device to get a list of instructions from the server to start the application change (install, update, or uninstall) process. The information returned by the server includes the files to be downloaded and the commands to be executed on the device. The device executes the application change commands in the order listed in the returned setup commands.

AppExResult initiateApplicationUpdates(String[ ] setupInfoIds)

Returns: an instance of the AppExResult that contains the SetupCommand array.

Parameters:

setupInfoIds—As parameter the device sends the setupInfoIds from the getApplicationUpdates response.

The deviceSetupStarts method informs the server that application setup has started on the device. It enables the server to invalidate all the old services associated with the software that is being changed. On the other hand if new application updates have been added on the server after the device has initiated the application update process and before this function call, the server returns an error code 301 indicating new application updates exist. When this happens, the device restarts the application update process.

AppExResult deviceSetupStarts( )
Returns: an instance of the AppExResult, which may issue the result code 301 to indicate that the device restarts the AppEx process.

When the device tries to request this method and gets no answer back from the server, it does not know whether the request has been received by the server or whether the response from the server was lost. In this case the device retries with a new request to this method. Note that this can result in a 420 error code if the response was lost.

The deviceSetupEnds method informs the server that the application setup on the device has completed. The server checks whether more software changes were scheduled in the meantime on the server and sends out a new notification when necessary.

AppExResult deviceSetupEnds(String anchor, int item-Ref, int error Code, String errorMsg)
Parameters:
anchor—The device sends a new anchor that represents the currently installed software.
itemRef this parameter may be used in two ways:
First, the itemRef specifies that the command at position "N" and all other commands less than that position "N" in the setup commands array are successful and all other commands are not executed.
Second, the itemRef indicates that the setup for the command at the position specified by itemRef, for example "M," has failed, all other commands with an offset less than "M" are successful, and all commands with an offset greater than "M" are not executed.
error Code—In case of an error, the cause of error is listed here. Otherwise an "OK" code is returned.
errorMsg—this parameter specifies a detailed error message. In case of success, this field is null.
Returns: an instance of the AppExResult.

This method is called under normal operation. If the current AppEx process uninstalls the program that includes the AppEx code, the device calls this method immediately before it starts the un-installation.

The applicationInstalled method informs the server that the application has been installed or updated. It is mandatory for every application which uses REx API or SetEx API to synchronize data between the device and the server. The primary usage of this method is for program update. The server calls this method to activate settings that are used by the updated software.

AppExResult applicationInstalled(String program d, int error Code, String errorMsg)
Parameters:
programId—uniquely identifies the application service on the server side.
error Code—In case of an error, the cause of error is listed here. Otherwise an OK code is returned.
errorMsg—Specifies a detailed error message. In case of a successful application installation, this field is null.
Returns: an instance of the AppExResult.

The applicationReadyToTest method informs the server that it wants to perform some testing to check whether it works correctly. The server uses this method to activate some test data.

AppExResult applicationReadyToTest(String programId, int error Code, String errorMsg)
Parameters:
programId—uniquely identifies the application service on the server side.
error Code—In case of an error, the cause of error is listed here. Otherwise an "OK" code is returned.
errorMsg—Specifies a detailed error message. In case of success this field is null.
Returns: an instance of the AppExResult.

The applicationReadyToGo method informs the server that it is ready for use. Each program that calls applicationInstalled or applicationReadyToTest is required to call the applicationReadyToGo method.

AppExResult applicationReadyToGo(String programId, int error Code, String errorMsg)
Parameters:
programId—uniquely identifies the application service on the server side.
error Code—In case of an error, the cause of error is listed here. Otherwise an "OK" code is returned.
errorMsg—Specifies a detailed error message. In case of success this field is null.
Returns: an instance of the AppExResult.

The initRefresh method is used when the device informs the server that it wants to re-install all software on the device. When the server receives this request, it marks all software which may be on the device for installation. When the device receives a successful response to this call, it performs a complete AppEx process to retrieve the commands.

AppExResult initRefresh( )
Returns: an instance of the AppExResult.

The server sends a notification when it has software changes for the device.

When a device calls getApplication Updates, the server assumes that the device has received the notification and clears the notification on the server side. This means that the device makes the result of getApplicationUpdates persistent for both the cases that the user postpones the software changes and that the device has been restarted. When the device receives a notification in the middle of an AppEx process, the device may ignore the notification. When the device calls deviceSetupEnds to terminate the AppEx process, the server checks whether more software changes exist and sends out a new notification if necessary.

Application Exchange Status Code

In settings exchange, the status code 300 is returned when the device is in the zombie mode. In this case, the device first sends the device type identification using the Device Provisioning Protocol to leave the zombie mode.

A call to the deviceSetupStarts method can return a 301 result code that forces the device to start with the whole AppEx process from the beginning by calling getApplicationUpdates. A request to getApplicationUpdates can return a 302 result code when the server currently is not able to determine whether software changes exist. This may happen when the server waits for a newly installed or updated software program to call applicationInstalled and/or applicationReadyToGo. In this case the device retries the request later for several times with an increased delay. After several retries, if the server still responds with the 302 status code, the device ends the whole AppEx process and just waits for the next notification.

A call to the checkSyncAnchors method can return a 417 result code that indicates the software on the device and the software the server believes may be on the device are different. Each call to the server may result in an error code 500. This is a temporary server error indicating the server is not able to respond to the device call at this moment for whatever reason. The data content has not been examined by the server, so it is not considered to be wrong. The client retries the same request using the same interval as before. After a given numbers of retries, the client may terminate the retry and wait for the next normal synchronization event, such as a notification or polling timeout.

Software Sync Anchors

Software sync anchors are used to detect when the software on the device is different from the software the server believes may be on the device. This may happen when the user tries to back up the whole device. In this situation, the software on the device may be incompatible with the software that was installed on the device through the server before the device was restored from the backup.

Both the device and the server are initialized to the same software sync anchor value to guarantee that they are in sync in the beginning. The device drives the sync anchors. Each time the device calls getApplicationUpdates or deviceSetupEnds, it sends a new anchor to the server, which stores the anchor. When the device receives from the server a successful response to the call, it replaces the current anchor with the new anchor which was sent to the server. When the call to getApplicationUpdates or deviceSetupEnds fails, the device does not know whether the server has received the request and has stored the new anchor. Therefore it resends the pending new anchor when it tries to call the request again.

Each time when it starts, the device sends the current anchor to the server using checkSyncAnchors. When the device has a pending new anchor that has not gotten a successful response for the deviceSetupEnds call, it sends this anchor as a parameter to the checkSyncAnchors call. The server compares the sent anchor (or the sent anchors) with the last anchor it has received from the device. When the anchors do not match, the device reports the problem to the user and calls initRefresh to start a complete software installation from scratch.

Application Exchange States

Figure 24:
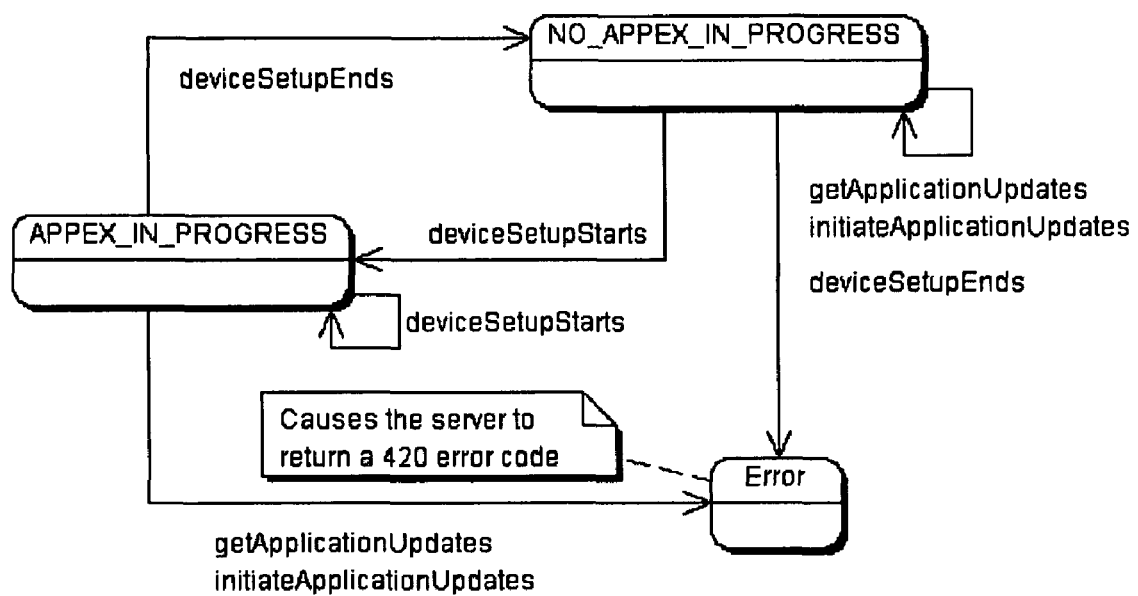
FIG. 24 illustrates an application exchange state transition diagram according to an embodiment of the present invention.

The server may be in one of two states during the software installation, uninstall or update process. FIG. 24 illustrates an application exchange state transition diagram according to an embodiment of the present invention. When the device calls an illegal method, the error state causes the server to return a 420 status code as a response to this call. Afterwards, the state machine returns to the state from which it transitioned to the error state.

To get out of an error state, the device may call getApplicationUpdates and restart the whole application exchange process. To do that, the device calls deviceSetupEnds with an error code (for example 200) and −1 as an itemRef. Then it starts a new AppEx process from a clean state with respect to the previously interrupted process.

Application Exchange Installations and Updates

When the device installs or updates software over AppEx, it may happen that the installation or update fails. When the changes have not been completely rolled back by the setup program (since the device has crashed), it may happen that the software is no longer useable. This is critical if the device tries to update the software which performs AppEx on the device.

If the device is still able to run the AppEx with the server, it may try to call the initRefresh method followed by the AppEx process to re-install all (and so the broken) software programs on the device. If the device is no longer able to run the AppEx programs, it uses the loader to send the device capabilities, such as the device type identification information, again to deliver the URL to the remote installer. This call implies that on the server side all software programs are marked for re-installation. The device installs the remote installer and then uses AppEx to re-install the software programs.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A system comprising:
    a server, for communicating with a user associated with a first user device and a second user device, comprising a connected-data-set, wherein the first and the second user device share portions of the connected-data-set, wherein said server comprises a processor and a storage medium for tangibly storing thereon program logic for execution by the processor the program logic comprising;
    logic, executed by the processor, for monitoring communications between the server and the at least the first and the second user device for a predetermined set of notification conditions, wherein the predetermined set of notification conditions are based in part upon usage of the connected-data-set, the predetermined set of notification conditions comprise task overflow conditions for the at least the first and the second user devices;
    logic, executed by the processor, for sending a notification message to the first user device in response to detection of a notification condition, the detection of the notification condition being related to usage of the connected-data-set at the second user device;
    logic, executed by the processor, for assigning priority to tasks nearer to the due date, if a task overflow condition is detected at the second user device;

logic executed by the processor, for deleting completed tasks at the at least the first and the second user devices from the oldest to the newest to create storage space for new tasks if necessary; and logic, executed by the processor, for communicating the new tasks from the server to the at least the first and the second user devices.

2. The system of claim 1, wherein the first and the second user device comprise:

at least one or more cellular phones, wireless personal digital assistants, navigation devices, personal computers, game consoles, Internet terminals, and Kiosks.

3. The system of claim 1, wherein the connected-data-set comprises:

at least one member of the group consisting of: emails, contacts, calendar, tasks, notes, pictures, music, documents, videos, bookmarks, and links.

4. The system of claim 1, wherein the set of predetermined notification conditions are formed according to information provided by the manufacturers and according to information gathered through actual usage of the first and the second user device.

5. The system of claim 1, wherein the set of predetermined notification conditions comprises transmission failures of elements of the connected-data-set.

6. The system of claim 1, wherein the notification message comprises a title of the communication that a notification condition is detected at the second user device.

7. The system of claim 1, wherein the notification message comprises a hyperlink to additional information of the communication that a notification condition is detected at the second user device.

8. The system of claim 1, wherein logic for sending a notification message comprises logic for transmitting the notification message to a third user device that the predetermined set of notification conditions is detected at the first user device.

9. The system of claim 1, wherein logic for sending a notification message comprises logic for transmitting the notification message to the first user device that the predetermined set of notification conditions is not detected.

10. The system of claim 1, wherein the server comprises:

at least one computer and data storage systems distributed in multiple geographical locations.

11. The system of claim 1, wherein the set of predetermined notification conditions further comprises:

email overflow conditions for the first and the second user devices;

calendar overflow conditions for the first and the second user devices; and address book overflow conditions for the first and the second user devices.

12. The system of claim 11 further comprising:

logic for assigning priority to new emails if an email overflow condition is detected at the second user device;

logic for deleting old emails at the first and the second user devices in response to the detection of the email overflow condition from the oldest to the newest to create storage space for the new emails if necessary; and logic for sending the new emails from the server to the second user device.

13. The system of claim 11 further comprising:

logic for assigning priority to future calendar events, if a calendar overflow condition is detected at the second user device;

logic for deleting past calendar events at the first and the second user devices in response to the detection of the calendar overflow condition from the oldest to the newest to create storage space for new calendar events if necessary; and logic for sending the new calendar events from the server to the first and the second user devices.

14. The system of claim 11 further comprising:

logic for assigning priority to the addresses already on the one or more user devices, if an address book overflow condition is detected at the one or more user devices; and logic for stopping delivery of new addresses from the server to the first and the second user devices in response to the detection of the address book overflow condition.

15. A method comprising:

a server communicating with a user associated with a first user device and a second user device, the server comprising a connected-data-set, wherein the first and the second user devices share portions of the connected-data-set;

monitoring via the server, communications with the first and the second user devices for a predetermined set of notification conditions, wherein the predetermined set of notification conditions are based in part upon usage of the connected-data-set, the predetermined set of notification conditions comprise task overflow conditions for the at least the first and the second user devices;

sending, via the server, a notification message to the first user device in response to a detection of a notification condition of the predetermined set, the detection of the notification condition being related to usage of the connected-data-set at the second user device;

assigning, via the server, priority to tasks nearer to the due date if a task overflow condition is detected at the first and the second user devices;

deleting, via the server, completed tasks at the first and the second user devices from the oldest to the newest to create storage space for new tasks if necessary; and communicating, via the server, the new tasks from the server to the first and the second user devices.

16. The method of claim 15, wherein the first and the second user device is a member of a group consisting of:

cellular phones, wireless personal digital assistants, navigation devices, personal computers, game consoles, Internet terminals, and Kiosks.

17. The method of claim 15, wherein the connected-data-set comprises data associated with at least one of a group consisting of:

emails, contacts, calendar, tasks, notes, pictures, music, documents, videos, bookmarks, and links.

18. The method of claim 15, wherein the set of predetermined notification conditions are formed according to information provided by the manufacturers and according to information gathered through actual usage of the first and second user devices.

19. The method of claim 15, wherein the set of predetermined notification conditions comprises transmission failures of elements of the connected-data-set.

20. The method of claim 15, wherein the notification message comprises a title of the communication that a notification condition is detected at the second user device.

21. The method of claim 15, wherein the notification message comprises a hyperlink to additional information of the communication that a notification condition is detected at the second user device.

22. The method of claim 15, wherein sending a notification message comprises transmitting the notification message to user devices that the predetermined set of notification conditions is detected at the second user device.

23. The method of claim 15, wherein sending a notification message comprises transmitting the notification message to user devices that the predetermined set of notification conditions is not detected at the second device.

24. The method of claim 15, wherein the server comprises:
at least one computer and data storage systems distributed in multiple geographical locations.

25. The method of claim 15, wherein the set of predetermined notification conditions further comprises:
email overflow conditions for the first and the second user devices;
calendar overflow conditions for the first and the second user devices; and
address book overflow conditions for the first and the second user devices.

26. The method of claim 25 further comprising:
if an email overflow condition is detected at the first and the second user devices, assigning priority to new emails;
deleting old emails at the first and the second user devices from the oldest to the newest to create storage space for the new emails if necessary; and
sending the new emails from the server to the first and the second user devices.

27. The method of claim 25 further comprising:
if a calendar overflow condition is detected at the first and the second user devices, assigning priority to calendar events that will occur in the near future;
deleting past calendar events at the first and the second user devices from the oldest to the newest to create storage space for new calendar events if necessary; and
sending the new calendar events from the server to the first and the second user devices.

28. The method of claim 25 further comprising:
if an address book overflow condition is detected at the first and the second user devices, assigning priority to the addresses already on the first and the second user devices; and
stopping delivery of new addresses from the server to the first and the second user devices.

29. A non-transitory computer-readable storage medium encoded with computer-executable instructions, that when executed by a processor of a computing device, perform a method comprising:
monitoring communications between a server and a first user device and a second user device for a predetermined set of notification conditions the first and second user devices being associated with a user, the server comprising a connected-data-set, where portions of the connected-data-set are shared with the first and second user devices, the predetermined set of notification conditions are based in part upon usage of the connected-data-set, the predetermined set of notification conditions comprise task overflow conditions for the first and the second user devices;
sending a notification message to the first user device in response to a detection of a notification condition, related to usage of the connected-data-set, at the second user device;
assigning priority to tasks nearer to the due date in response to a detection of a task overflow condition at the-second user device;
deleting completed tasks at the first and the second user devices from the oldest to the newest to create storage space for new tasks if necessary; and
communicating the new tasks from the server to the first and the second user devices.

30. The non-transitory computer-readable storage medium of claim 29, wherein the computer-executable instructions are executable by at least one of a group consisting of: cellular phones, wireless personal digital assistants, navigation devices, personal computers, game consoles, Internet terminals, and Kiosks.

31. The non-transitory computer-readable storage medium of claim 29, wherein the connected-data-set comprises:
at least one of a group consisting of: emails, contacts, calendar, tasks, notes, pictures, music, documents, videos, bookmarks, and links.

32. The non-transitory computer-readable storage medium of claim 29, wherein the set of predetermined notification conditions are formed according to information provided by the manufacturers and according to information gathered through actual usage of the first and the second user devices.

33. The non-transitory computer-readable storage medium of claim 29, wherein the set of predetermined notification conditions comprises transmission failures of elements of the connected-data-set.

34. The non-transitory computer-readable storage medium of claim 29, wherein the notification message comprises a title of the communication that a notification condition is detected.

35. The non-transitory computer-readable storage medium of claim 29, wherein the notification message comprises a hyperlink to additional information of the communication that a notification condition is detected.

36. The non-transitory computer-readable storage medium of claim 29, wherein sending a notification message comprises transmitting the notification message to a third user device that the predetermined set of notification conditions is detected at the second user device.

37. The non-transitory computer-readable storage medium of claim 29, wherein sending a notification message comprises transmitting the notification message to the first user device that the predetermined set of notification conditions is not detected.

38. The non-transitory computer-readable storage medium of claim 29, wherein the server comprises:
at least one computer and data storage systems distributed in multiple geographical locations.

39. The non-transitory computer-readable storage medium of claim 29, wherein the set of predetermined notification conditions further comprises:
email overflow conditions for the at least first and the second user devices;
calendar overflow conditions for the first and the second user devices; and
address book overflow conditions for the first and the second user devices.

40. The non-transitory computer-readable storage medium of claim 39, wherein the executable instructions are further for:
assigning priority to new emails, in response to a detection of an email overflow condition at the second user device;
deleting old emails at the at least the first and the second user devices from the oldest to the newest to create storage space for the new emails if necessary; and
sending the new emails from the server to the first and the second user devices.

41. The non-transitory computer-readable storage medium of claim 39, wherein the executable instructions are further for:
assigning priority to calendar events that will occur in the near future in response to a detection of a calendar overflow condition at the second user device;

deleting past calendar events at the first and second user devices from the oldest to the newest to create storage space for new calendar events if necessary; and sending the new calendar events from the server to the first and the second user devices.

42. The non-transitory computer-readable storage medium of claim 39, wherein the executable instructions are further for:

assigning priority to the addresses already on the first and the second user devices in response to a detection of an overflow condition at the second user device; and stopping delivery of new addresses from the server to the first and the second user devices.

* * * * *